United States Patent [19]

Hsu

[11] Patent Number: 5,430,617
[45] Date of Patent: Jul. 4, 1995

[54] MODULAR ELECTRONIC PACKAGING FOR INTERNAL I/O MODULES

[76] Inventor: Winston Hsu, 14508 Pebblewood Dr., Gaithersburg, Md. 20878

[21] Appl. No.: 15,294

[22] Filed: Feb. 4, 1993

Related U.S. Application Data

[63] Continuation-in-part of Ser. No. 769,539, Sep. 30, 1991, abandoned, which is a continuation-in-part of Ser. No. 964,569, Oct. 21, 1992.

[51] Int. Cl.$^6$ .............................................. H05K 9/00
[52] U.S. Cl. .................................. 361/818; 361/683; 361/732; 361/735; 361/740; 361/744; 361/790; 361/792; 361/785
[58] Field of Search ............................. 361/679–687, 361/728–730, 732, 735, 740, 744, 790, 785, 792, 818, 816; 364/708.1

[56] References Cited

U.S. PATENT DOCUMENTS

| | | | |
|---|---|---|---|
| 3,309,577 | 3/1967 | Roll, Jr. | 361/393 |
| 4,479,198 | 10/1984 | Romano et al. | 361/687 |
| 4,581,495 | 4/1986 | Geri et al. | 361/393 |
| 4,591,949 | 5/1986 | Lahr | 361/380 |
| 4,728,160 | 5/1988 | Mondor | 312/236 |
| 4,748,540 | 5/1988 | Henneberg | 361/424 |
| 4,934,764 | 6/1990 | Leitermann | 312/111 |
| 4,937,771 | 6/1990 | Rumps, Jr. et al. | 361/380 |
| 4,937,806 | 6/1990 | Babson et al. | 361/391 |
| 5,107,400 | 4/1992 | Kobsyashi | 361/392 |
| 5,132,876 | 7/1992 | Ma | 361/681 |
| 5,224,019 | 6/1993 | Wong et al. | 361/685 |

FOREIGN PATENT DOCUMENTS

| | | | |
|---|---|---|---|
| 2434892 | 2/1976 | Germany | 361/380 |
| 8808662 | 11/1988 | WIPO | 361/384 |

OTHER PUBLICATIONS

Unisys' Open Approach Keeps CTOS Strong, LAN Computing—The Newspaper of Standard and Interoperability, Jun. 1991 vol. 2, No. 12 p. 1.
Catalog of Octagon Systems, Micro PC—The Industrial PC Bus, Picture on p. 1.

Primary Examiner—Gregory D. Thompson

[57] ABSTRACT

A modularized electronic system such as notebook or palmtop computer for packaging and assembling one or more electronic I/O module assemblies comprises one upper case assembly and one lower case assembly for mounting the I/O modules in between. Each I/O module comprises a module head and a substantially rectangular module body. The module head further comprises a rigid module connector on its bottom, vertically plugged in a receptacle on the lower case assembly. The module body further comprises a substantially rectangular protruding port on its rear end. The lower case assembly further comprises a U-shaped side opening wherein the rear protruding port of the module body engages and securely attaches to the U-shaped side opening. The I/O module is upwardly supported by the lower case assembly over the module head and the rear protruding port only. The internal mounting mechanism design allows maximum modularization for portable computer systems and can be used as a complementary I/O module design for PCMCIA I/O cards.

37 Claims, 20 Drawing Sheets

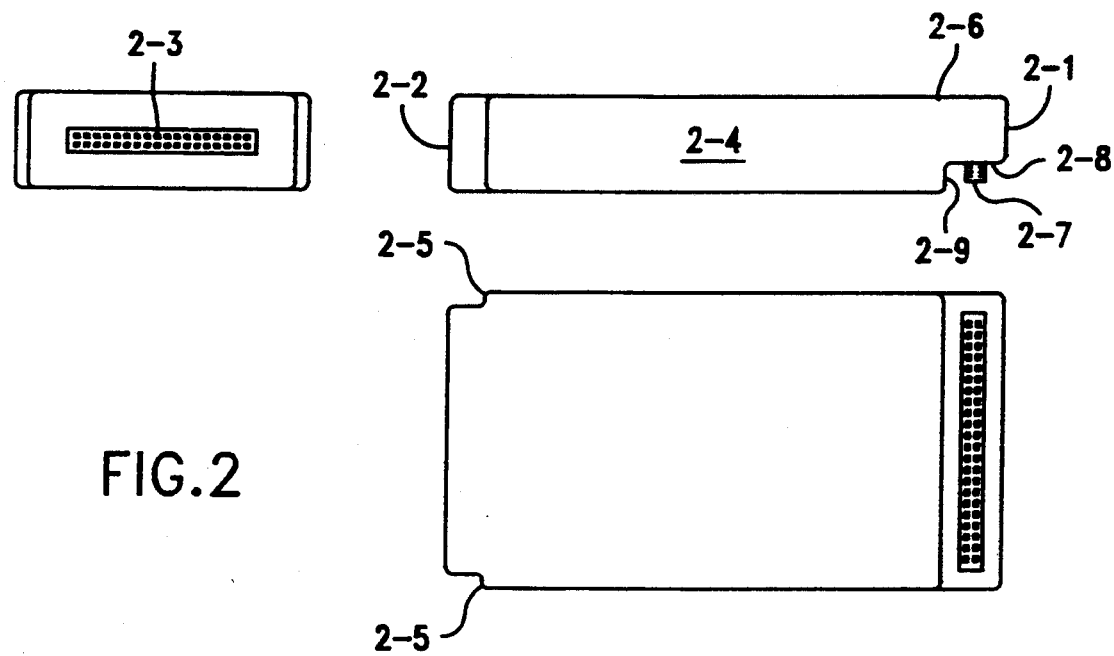
FIG.2
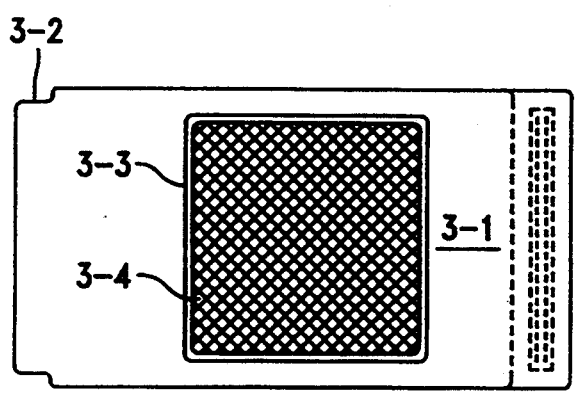
FIG.3
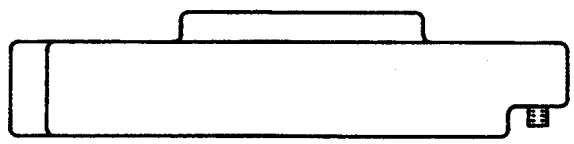
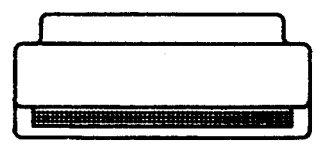

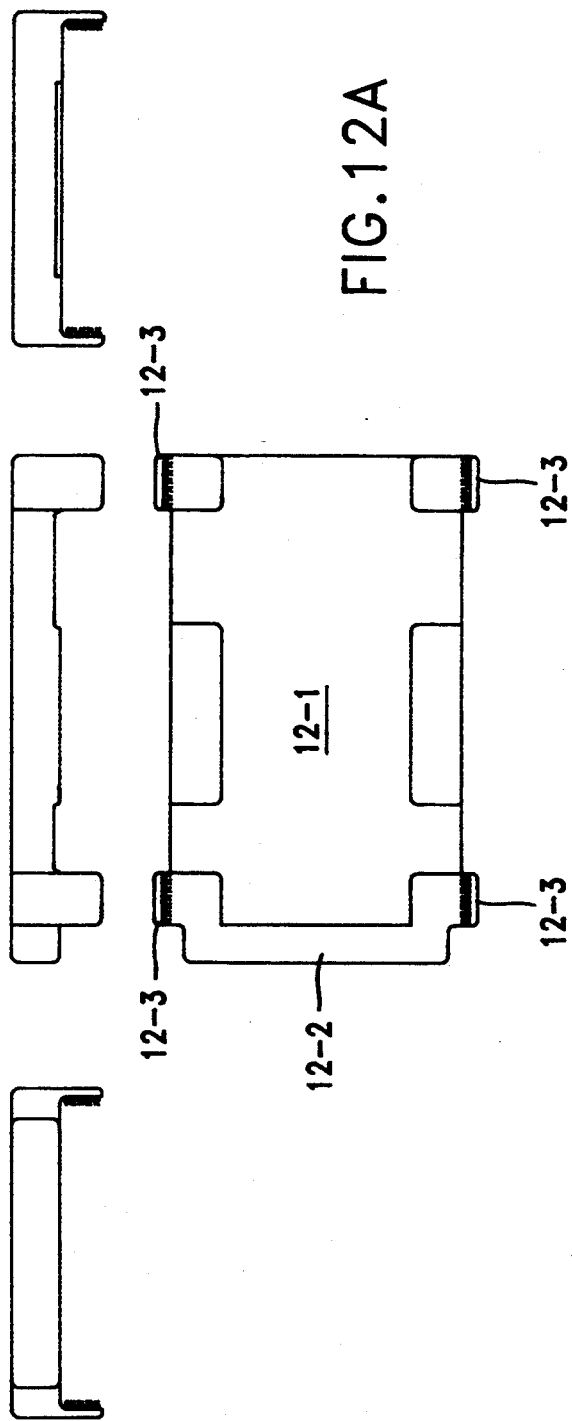
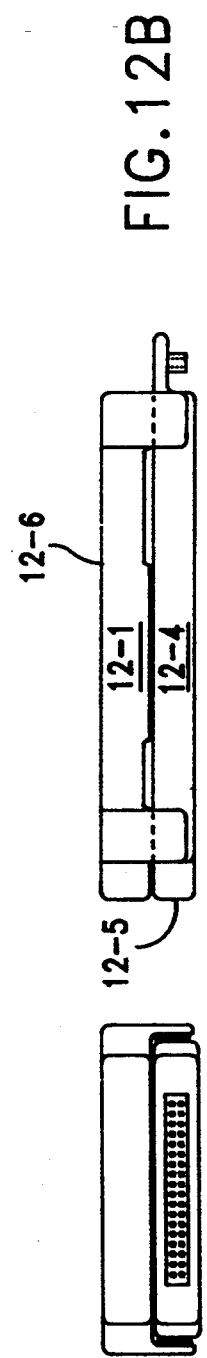

MODULAR ELECTRONIC PACKAGING FOR INTERNAL I/O MODULES

This application is a CIP of 07/769,539, filed Sep. 30, 1991, now abandoned which is a CIP of 07/964,569 filed Oct. 21, 1992 still pending.

BACKGROUND OF THE INVENTION

1. Field of the Invention

This invention relates generally to the internal mounting mechanism of an electronic system, e.g., a portable computer, and more particularly, to an electronic system comprising one or more electronic module assemplies with external I/O ports and an external enclosure case for mounting all these modules.

2. Description of the Prior Art

The internal I/O module design for portable computers such as notebook or palmtop computers has been an area in which progress has not kept up with the fast growing personal computer industry. There is no industry standard for internal I/O modules such as internal modems or LAN adapters. Most portable manufacturers still use their own proprietary modular solutions to differentiate themselves from others. Since there is no internal I/O module standard for peripheral vendors to follow, three different electronic packaging methods have been used by peripheral vendors to overcome this problem.

The first packaging method is by means of external portable modules. Many compact and light-weight portable modules have been developed and produced by peripheral vendors using this first alternative. Users may select a variety of portable modules from many vendors offering external module solutions. However, portable modules have some serious weaknesses when compared with internal modules. First, external modules usually require alternative, external power sources. Second, the user has to set up the module whenever he/she wants to use the portable module's feature, and he/she must pack it up after finishing with it. And finally, the external interface speed is necessarily slow, making the external module impractical given the power and speed provided by the state-of-the-art CPUs running in most portable computers.

The second packaging method is customized integration by convincing portable computer vendors to integrate needed I/O modules such as Ethernet adapter into their portable computer motherboards. Such integration may ultimately reduce the packaging cost and also provide very good performance, but it also raises some questions. First of all, the existing hard tooling often must be modified to include the integrated I/O port. Secondly, it is difficult to provide flexibility and alternative solutions within such integrated designs. Any variation or modification becomes a new design. Thirdly, customers who have no need for the integrated feature are forced to pay for it.

The third packaging method is by means of PCMCIA I/O card. PCMCIA release 2.0 has extended its card definition to include I/O modules. Many I/O modules, such as modems, LAN adapters, etc. have been built according to this standard. Compared with the external portable module, the PCMCIA I/O card can draw its power directly from the portable computer, and its functionality and performance is much better than a correspondent external portable module. Additionally, handling is also relatively easy since the cards are easily installed and removed and do not require external power converters and interfaces.

PCMCIA I/O cards have received generally good acceptance and many peripheral vendors are busy developing their own PCMCIA-standard I/O modules. Many portable computer vendors have included PCMCIA slot(s) in their new portable systems. However, there are still some serious weakness in PCMCIA's I/O card design.

First, it is difficult to increase the number of PCMCIA slots to achieve maximum modularity in a portable computer. A desktop computer usually has eight add-on card slots and four or five spaces for internally mounted disk drives, CD-ROMs, etc. A user can conveniently install many modules in a desktop computer which will generally reside inside the desktop computer for a long time once they are installed. On the contrary, a user must constantly change PCMCIA I/O modules for their portable computer because there is often only one or two PCMCIA slots offered in most portable computers. Increasing the number of PCMCIA slots in a portable computer is physically not a difficult task, but it results in a strange, inconvenient portable computer design. PCMCIA cards are designed for maximum portability, not for maximum modularity.

Secondly, I/O ports on PCMCIA I/O cards can only be placed on the card's rear end because the card is designed to be slid into a PCMCIA slot horizontally. Many chassis-dependent I/O ports, such as track-ball mice, speakers, control panels, etc., cannot be modularized based on the PCMCIA I/O card design. Modifications or changes of these chassis-dependent I/O ports lead to many hard tooling changes and PCB board relayout. The PCMCIA I/O card design offers no solution for it.

Thirdly, the PCMCIA I/O card design does not allow further modularization. Each PCMCIA I/O card must be built as an integral unit. Users cannot change its mechanical or electronic features for different electronic applications.

And finally, it is difficult, and often impossible, to use traditional PCB-based components and assembly technologies to build PCMCIA I/O cards. All the components must be shrunk into a very compact size and fit into a small, credit-card type enclosure. Material and assembly costs to produce PCMCIA I/O cards are very high.

In general, PCMCIA I/O cards and other packaging methods fail to serve as a standard packaging method to achieve a design for portable computers which delivers maximum internal modularity. New internal mounting mechanisms are necessary to increase the maximum number of internal I/O modules which a portable computer can accept, and to modularize those chassis-dependent I/O ports to allow easy reconfiguration by end users while also reducing the hard tooling changes and expense for portable computer vendors.

SUMMARY OF THE PRESENT INVENTION

It is therefore the goal of the present invention, by overcoming the limits of the prior art, to devise new internal mounting mechanisms to achieve the following objects:

1. Design a general purpose mounting mechanism for both the internal I/O modules and the external enclosure case which allows maximum modularization of a portable computer system and can be used as a complementary design for PCMCIA cards.

2. Allow many chassis-dependent components to be modularized as standard modules.
3. Allow the design of composite modules which are created by connecting two or more small modules together such that their electronic functions or mechanical features can be easily changed.
4. Allow the use of traditional PCB-based technologies to build internal I/O modules.

Briefly, in a preferred embodiment, the present invention includes a modularized electronic system for packaging and assembling a one or more electronic module assemblies comprising one external enclosure case having at least two case assemblies each having at least one case assembly attachment means wherein said assembly attachment means of one of said case assemblies engages and securely attaches to said assembly attachment means of another of said case assemblies in a removable manner. One of said case assemblies comprising the top panel of said external enclosure case is called the upper case assembly and another of said case assemblies comprising the bottom panel of said external enclosure case is called the lower case assembly.

At least one electronic module assembly has a module head in its front end and a substantially rectangular module body behind said module head. Said module head is rigidly connected to said module body. Said module head further comprises a rigid module connector on its bottom facing downward for transmitting digital signals and/or power. Said lower case assembly further comprises a correspondent rigid BUS receptacle wherein said module connector of the module head is vertically plugged in said BUS receptacle of the lower case assembly in a removable manner.

Said module body further comprises a substantially rectangular protruding port on its rear end and said lower case assembly further comprises a side panel of the external enclosure case with a correspondent U-shaped side opening on its upper edge wherein said rear protruding port of the module body engages and securely attaches to said U-shaped side opening of the lower case assembly in a removable manner whereby said rear protruding port of the module body can be accessed externally from the rear end, and said module assembly is upwardly supported by said lower case assembly over said module head and said rear protruding port only.

Said upper case assembly further comprises at least one clamping means on its top panel wherein said clamping means of the upper case assembly engages and removably attaches to the upper end of said module assembly whereby said module assembly is horizontally clamped between said upper and lower case assemblies.

It is an advantage of the present invention that it can be used as a general purpose mounting mechanism which allows maximum modularization of an electronic system such as a portable computer. The internal I/O modules of this invention can be easily installed in a portable computer and permanently reside inside without frequently being installed and removed. All the existing PCMCIA I/O modules can be easily repackaged as such internal I/O modules.

These and other objects and the advantages of the present invention will no doubt become obvious to those of ordinary skill in the art after having read the following detailed description of the preferred embodiment which is illustrated in the various figures and drawings.

BRIEF DESCRIPTION OF THE DRAWINGS

FIG. 2 shows the side, rear and bottom views of the construction of a module with a rear protruding port.

FIG. 3 shows the top, front and side views of the construction of a module with both rear and upper protruding ports.

FIG. 6A is a bottom view of part of an upper case assembly with cushion pads installed.

FIG. 6B is a top view of part of a lower case assembly with a BUS receptacle and a side opening installed.

FIG. 6C is a top view of the lower case assembly installed with a module having a rear protruding port.

FIG. 6D is an exploded side section view and a rear view of the external enclosure case and the module.

FIG. 6E is a side section view and a rear view of the external enclosure case with the module installed in it.

FIG. 7A is a bottom view of part of an upper case assembly with a top opening and a cushion means installed.

FIG. 7B is an exploded side section view of the external enclosure case and a module having both rear and upper protruding ports.

FIG. 7C is a side section view of the external enclosure case with the module installed.

FIG. 8A is a top view of part of a lower case assembly having a BUS receptacle with two hook receiving devices on both sides.

FIG. 8B is a top view of the lower case assembly installed with a module having two elastic clip devices on its module head.

FIG. 8C is an exploded side section view of the external enclosure case and the module.

FIG. 8D is a side section view of the external enclosure case with the module installed.

FIG. 9A is a top view of the lower case assembly with the module installed.

FIG. 9B is an exploded side section view of the external enclosure case and the module.

FIG. 9C is a side section view of the external enclosure case with the module installed.

FIG. 10A is a bottom view of part of an upper case assembly without any cushion pad.

FIG. 10B is an exploded side section view of the external enclosure case and the module with front end latching means and rear protruding port.

FIG. 10C is a side section view of the external enclosure case with the module installed.

FIG. 11A is a bottom view of part of an upper case assembly with a top opening and a cushion means installed around the top opening.

FIG. 11B is an exploded side section view of the external enclosure case and the module with front end latching means and rear and upper protruding ports.

FIG. 11C is a side section view of the external enclosure case with the module installed.

FIGS. 12A–12E illustrates the construction and usage of a mounting kit with rear protruding port.

FIG. 12A shows the front, side, rear and bottom views of a mounting kit with rear protruding port.

FIG. 12B is a side view and a rear view of a module with the mounting kit attached on top of it.

FIG. 12C is a top view of part of a lower case assembly with the module and the mounting kit installed.

FIG. 12D is a side section view of the external enclosure case with the module and mounting kit installed.

FIG. 12E is similar to FIG. 12D except that the module installed has a front end latching means on both sides of its module head.

FIG. 13A shows the front, side and bottom views of a small module with an upper protruding port.

FIG. 13B shows the top, front and side views of a base module with a rear protruding port.

FIG. 13C shows the top, front and side views of a composite module created by stacking these two modules together.

FIG. 13D is a top view of part of a lower case assembly with the composite module installed.

FIG. 13E is a side section view of the external enclosure case with the composite module installed.

FIG. 13F is similar to FIG. 13E except that the base module has a front end latching means on both sides of its module head.

FIG. 14A shows the top, side and rear view of the PCB module with rear and upper protruding ports.

FIG. 14B is a top view of part of a lower case assembly with the PCB module installed.

FIG. 14C is a side section view of the external enclosure case installed with the PCB module.

FIG. 14D is similar to FIG. 14C except that the PCB module has a front end latching means on both sides of its module head.

FIG. 15A is an exploded side view of a mounting kit and a small PCB module.

FIG. 15B is a side view of the small PCB module with the mounting kit attached on top of it.

FIG. 15C is a side section view of the external enclosure case installed with the small PCB module and the mounting kit.

FIG. 16A shows a side section view and a bottom view of part of an upper case assembly with four elastic springs installed for module mounting.

FIG. 16B is a side section view of the external enclosure case with a module installed by using the upper elastic springs.

FIG. 16C is a side section view of the external enclosure case with a small module and a mounting kit installed.

DETAILED DESCRIPTION OF THE PREFERRED EMBODIMENT

Figure 1A:
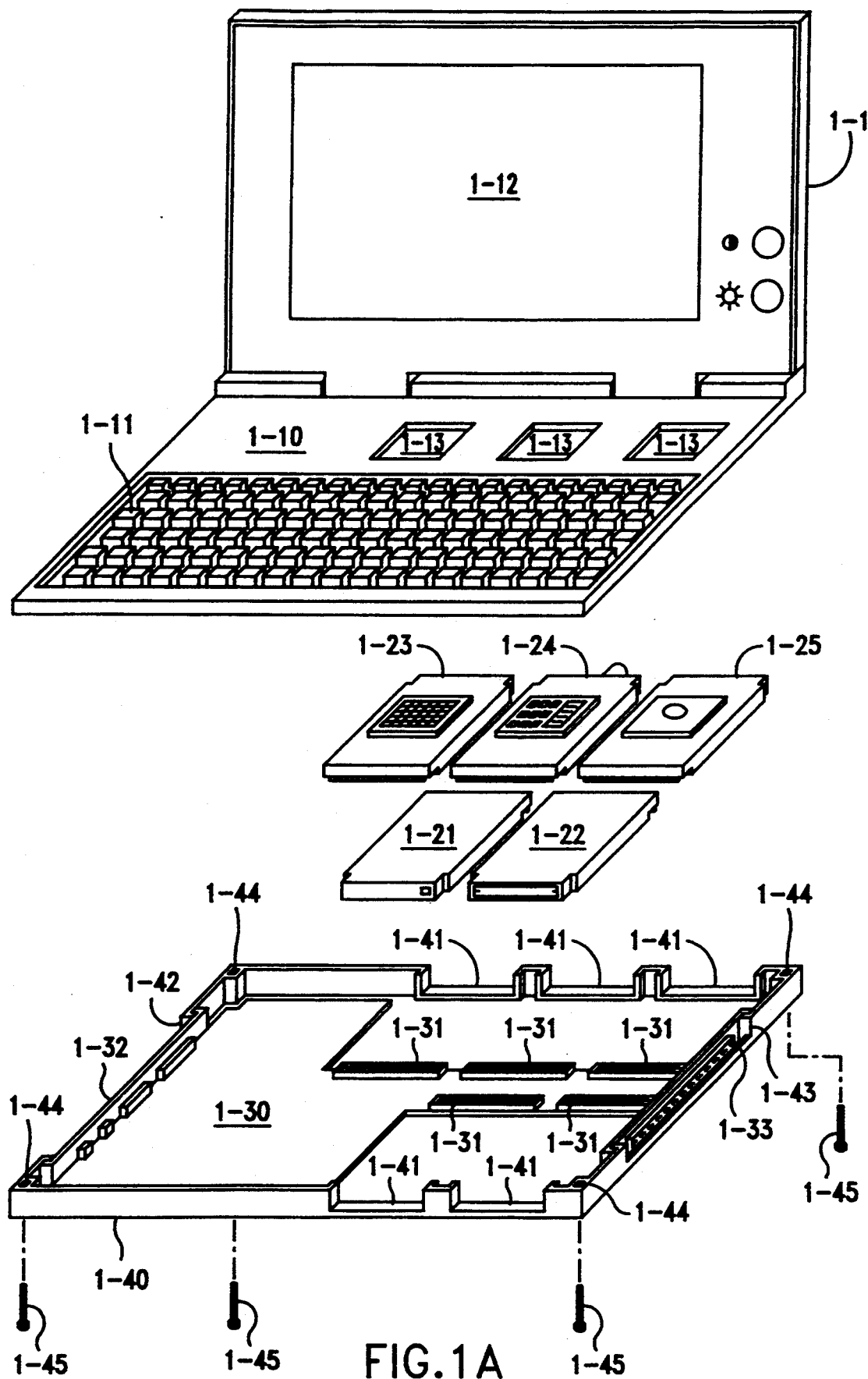
FIG. 1A is an exploded perspective view of a portable computer according to the present invention.
Figure 1B:
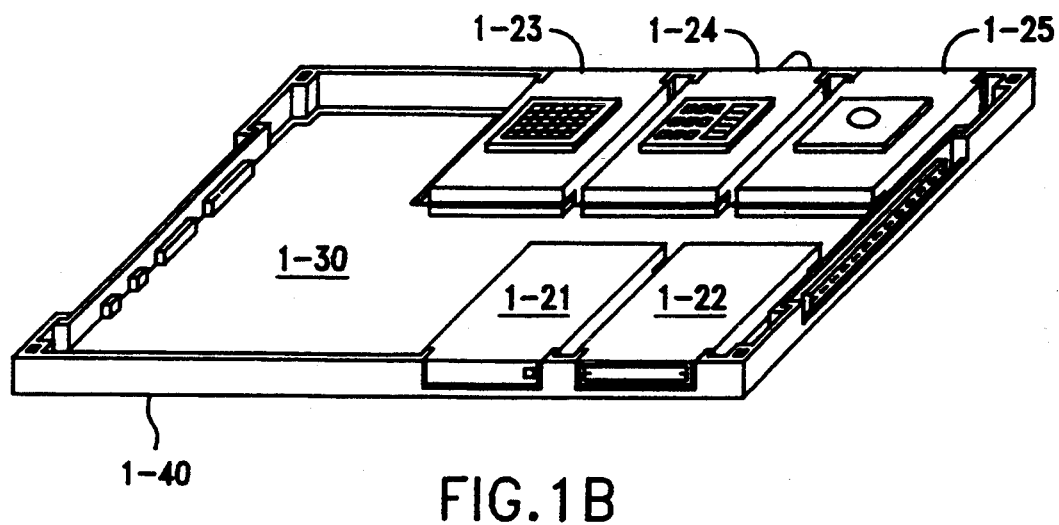
FIG. 1B is a partial perspective view of FIG. 1A having a lower case assembly with all the module assemblies installed.
Figure 1C:
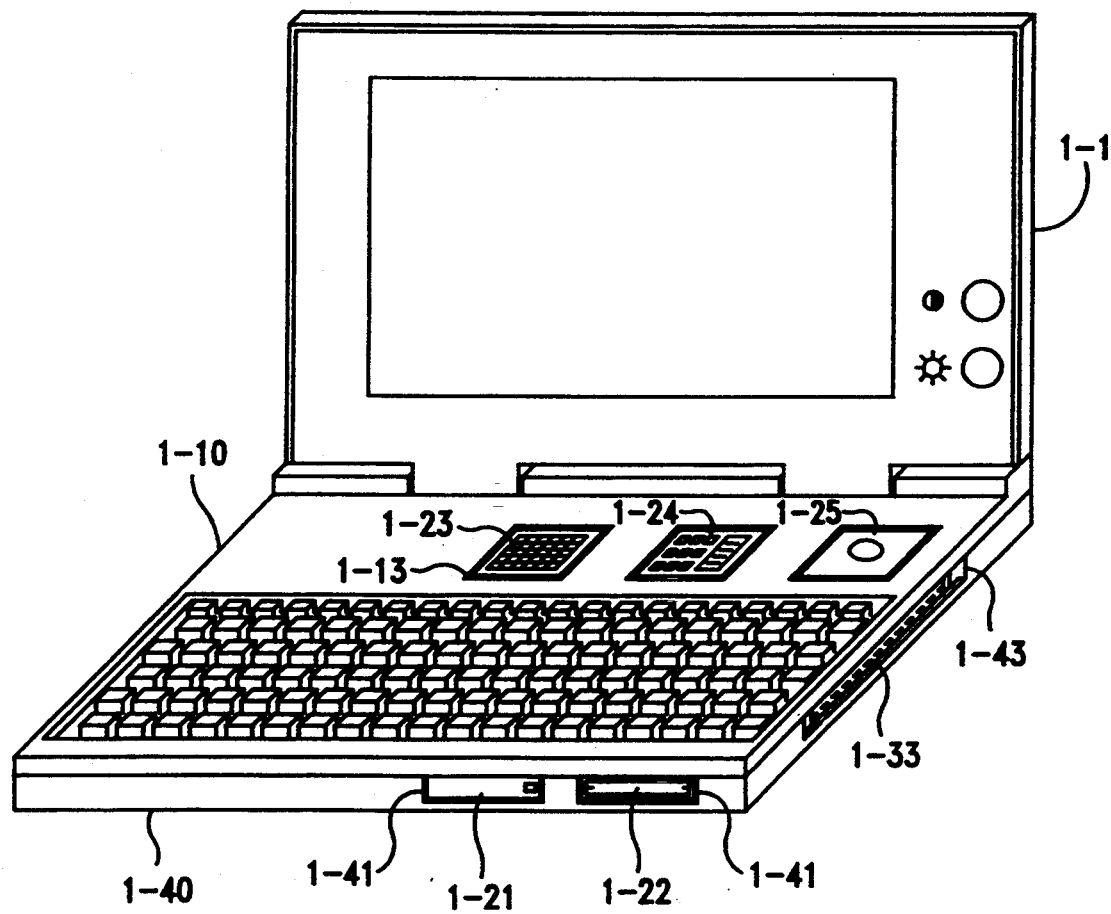
FIG. 1C is a perspective view of the final system assembly of FIG. 1A which shows the I/O ports of the portable computer system.

FIGS. 1A–1C shows a modularized portable computer system 1-1 according to the present invention. It shows that the external enclosure case of the portable computer system 1-1 has two case assemblies each having at least one case assembly attachment means wherein said assembly attachment means of one of said case assemblies engages and securely attaches to said assembly attachment means of another of said case assemblies in a removable manner. One of said case assemblies comprising the top panel of said external enclosure case is called the upper case assembly and another of said case assemblies comprising the bottom panel of said external enclosure case is called the lower case assembly.

FIG. 1A shows the modularized portable computer system 1-1 in a disassembled form. Upper case assembly 1-10 has a keyboard 1-11, an LCD screen 1-12 and three top openings 1-13. Upper case assembly 1-10 and lower case assembly 1-40 can be fastened together by four screws 1-45 through the screw mounting holes 1-44 over the four corners of the lower case assembly 1-40.

There are five electronic modules: 1-21, 1-22, 1-23, 1-24, and 1-25 in this system. Module 1-21 is a hard drive module with LED light on its rear protruding port. Module 1-22 is a memory card guide which can take two commercially available memory cards. Module 1-23 is a multimedia module with a speaker on top of it. Module 1-24 is a cellular fax/modem module with an antenna on its rear end and a keypad on its upper end. Module 1-25 is a track-ball mouse module. The front end module connectors of all these modules 1-21, 1-22, 1-23, 1-24 and 1-25 will be vertically plugged into BUS receptacles 1-31 of the expansion BUS module 1-30.

Expansion BUS module 1-30 has one metal plate 1-32 on its left hand side and another metal plate 1-33 on its right hand side. Metal plate 1-32 is vertically attached to the side opening 1-42 of the lower case assembly 1-40, and metal plate 1-33 is also vertically attached to another side opening 1-43 of the lower case assembly 1-40. There are five BUS receptacles 1-31 on the expansion BUS module 1-30 for transmitting digital electronic signals and/or power to modules. The expansion BUS module which transmits optical signals as media through the module interface can also use such internal mounting mechanism design. Lower case assembly 1-40 is the bottom unit for mounting the expansion BUS module and all other modules. It has two U-shaped side openings 1-41 in the front end and three U-shaped side openings 1-41 on the rear end for mounting modules with rear protruding ports.

FIG. 1B shows lower case assembly 1-40 loaded with expansion BUS module 1-30 and all five modules. All these modules can be vertically plugged to or removed from the lower case assembly by hand without using any tools. Such vertical installation not only facilitates human system assembly work, but also facilitates robotic installation because most robots used in electronic assembly lines have only vertical vision and perform mostly vertical installation motions. All these modules installed on the lower case assembly 1-40 will later on be clamped by upper case assembly 1-10 over their upper ends as will be shown on FIG. 1C.

FIG. 1C shows the final assembly of the portable computer system 1-1 where the upper case assembly 1-10 and the lower case assembly 1-40 are fastened together by four screws 1-45 (not shown). The upper protruding ports of module 1-23, 1-24 and 1-25 extend through the top openings 1-13 and can be accessed from the top. The rear end of the memory guide module 1-22 extends through the front U-shaped opening 1-41 for convenient access. And the I/O port on the metal plate 1-33 is also accessible through the side opening 1-43 of the lower case assembly 1-40.

FIGS. 1A-1C demonstrates that many chassis-dependent features such as track-ball mouse, speaker, control panel, etc., can be modularized as internal I/O modules. Users can choose these modules and make arrangement of each module's position according to their needs. Such modularization not only facilitates customization by end users, but also reduces the need for costly hard tooling change by the portable computer vendors.

FIG. 2 shows the construction of a module with a protruding port on its rear end. It shows the side view, rear view and bottom view of a module 2-1 with a substantially rectangular rear protruding port 2-2. Module 2-1 has a module head 2-6 in its front end and a substantially rectangular module body 2-4 behind the module head 2-6. Module head 2-6 is rigidly connected to the module body 2-4. The upper end of module body 2-4 is substantially flat and can be used for module clamping by something above it. Module head 2-6 further comprises a rigid module connector 2-7 on its bottom facing downward for transmitting digital signals and/or power. Module connector 2-7 is a female connector which makes module 2-1 more durable for module installation and handling. The bottom 2-8 of module head 2-6 on which module connector 2-7 is installed is made higher than the bottom of the module body 2-4 so that module connector 2-7 can be positioned higher to make module 2-1 more compact. Module connector 2-7 is positioned higher than the bottom of the module body 2-4 so that module connector 2-7 will not touch the bottom surface when placed externally and thus makes it easier to keep module connector 2-7 clean and to avoid damage. Module body 2-4 further comprises a substantially flat and straight vertical front edge 2-9 between its bottom and bottom 2-8 of the module head for module mounting purpose. Two protruding edges 2-5 are installed on left- and right-hand sides of the rectangular neck of the rear protruding port 2-2 for the mounting of the rear protruding port 2-2. There is a connector 2-3 installed on the rear protruding port 2-2 for external connection. The mounting of module 2-1 will be discussed in FIG. 6.

FIG. 3 shows the construction of a module with both rear and upper protruding ports. It shows the top view, front view and side view of a module 3-1 with rear protruding port 3-2 and upper protruding port 3-3. In this example, speaker 3-4 is installed on the upper protruding port 3-3. The mounting of module 3-1 will be discussed in FIG. 7.

Figure 4:
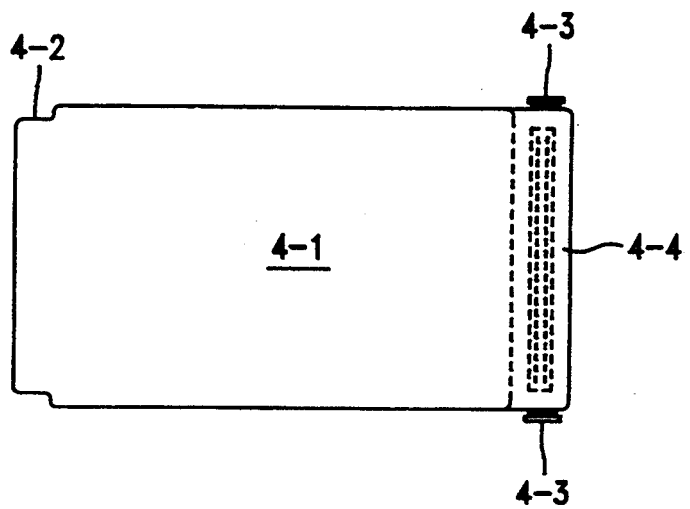
FIG. 4 shows the top, front and side views of the construction of a module with two elastic clip devices installed on both sides of its module head.

FIG. 4 shows the construction of a module with two elastic clip devices installed on both sides of its module head. It shows the top view, front view and side view of a module 4-1 with two elastic clip devices 4-3 installed on left- and right-hand sides of its module head 4-4. Module 4-1 also has a rear protruding port 4-2. The detailed construction of the elastic clip devices and its installation will be discussed in FIG. 5.

Figure 5:
FIG. 5 shows the detailed construction of the clip devices of the module in FIG. 4 where the clip devices are connected to a receptacle having two hook receiving devices on both sides.
Figure 5:
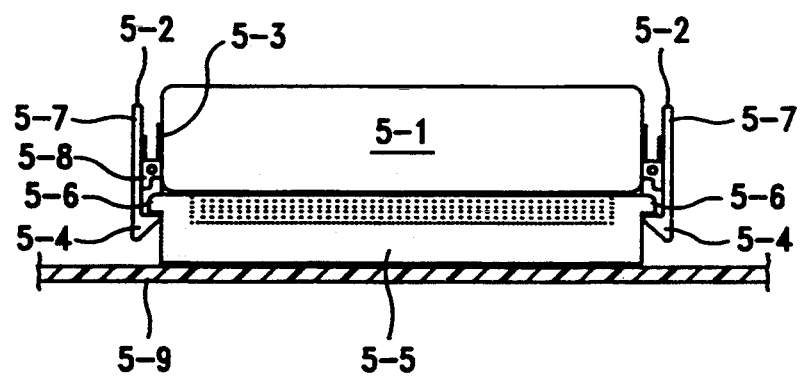

FIG. 5 shows the detailed construction of the front end latching devices. It shows a module head having a latching means on its left- and right-hand sides and a BUS receptacle of the lower case assembly comprising a correspondent latch receiving means on both sides wherein the latching means of the module head engages and securely latches to the latch receiving means of the BUS receptacle in a removable manner whereby the connection between said module connector of the module head and said BUS receptacle of the lower case assembly is strongly secured.

Module head 5-1 has two elastic clip devices 5-2 installed on its left- and right-hand sides. Each elastic clip device 5-2 has a hook device 5-4 on its lower end, a handle 5-7 on its upper end for releasing the clip device, a joint 5-8 with a clip stop on its lower end, and a spring 5-3 for supporting the clip device. The latch receiving means of BUS receptacle 5-5 of the lower case assembly comprises two hook receiving devices 5-6 on both sides of the BUS receptacle 5-5. The hook device 5-4 of module head 5-1 engages and securely hooks to a correspondent hook receiving device 5-6 of BUS receptacle 5-5 to prevent loose connection. BUS receptacle 5-5 is soldered on the expansion BUS module 5-9. Each clip device 5-2 can be released by pressing the handle 5-7 inwardly and the whole module head 5-1 can be released and removed from the receptacle 5-5 by a simple pressing and pulling action on both handles 5-7. The front end latching means not only secures the module connection, but also allows module designers to use low-profile module connectors to make the whole module more compact, or to use low insertion force module connectors to facilitate the installation and removal of such modules.

Figure 6A:
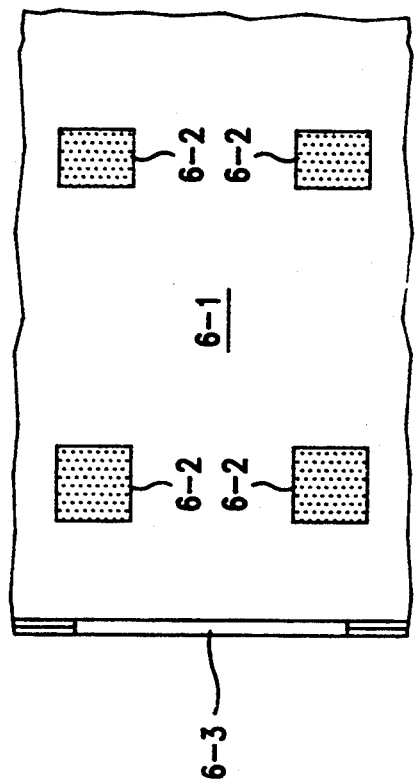
FIGS. 6A–6E illustrates mounting a module with rear protruding port in an external enclosure case.
Figure 6B:
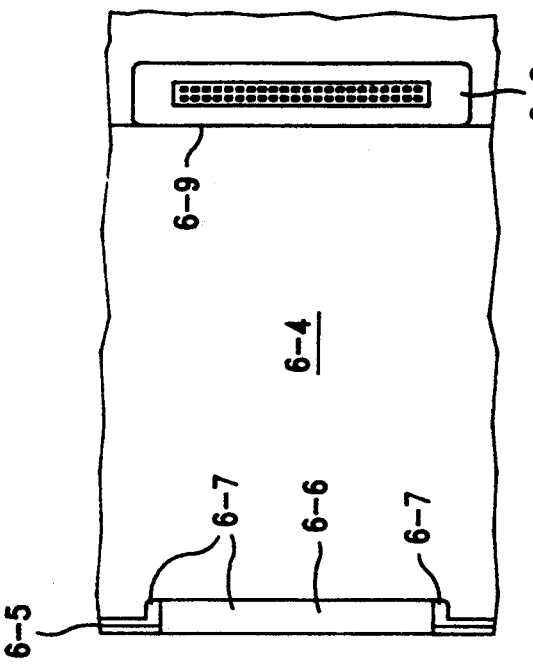

FIGS. 6A-6E illustrates mounting a module with rear protruding port in an external enclosure case. FIG. 6A and FIG. 6B shows the construction of an upper case assembly and lower case assembly for module mounting. FIG. 6A is a bottom view of part of an upper case assembly 6-1 with four cushion pads 6-2 installed as the clamping means which are used to clamp the module assembly mounted under it and also provide shock protection to it. Side panel 6-3 of the upper case assembly 6-1 will clamp the upper end of a rear protruding port when the case is in closed position.

FIG. 6B shows that the lower case assembly comprises a side panel of the external enclosure case with a correspondent U-shaped side opening on its upper edge for mounting the rear protruding port of a module. It is a top view of part of a lower case assembly 6-4 with a U-shaped side opening 6-6 over the upper edge the side panel 6-5 having a protruding edge 6-7 for loading rear protruding port. The lower case assembly 6-4 further comprises a rigid BUS receptacle 6-8 installed on the bottom panel of the lower case assembly 6-4 for module connection and mounting. BUS receptacle 6-8 is a male connector. The BUS receptacle 6-8 of the lower case assembly 6-4 further comprises a flat and straight vertical edge 6-9 for module mounting purpose.

Figure 6C:
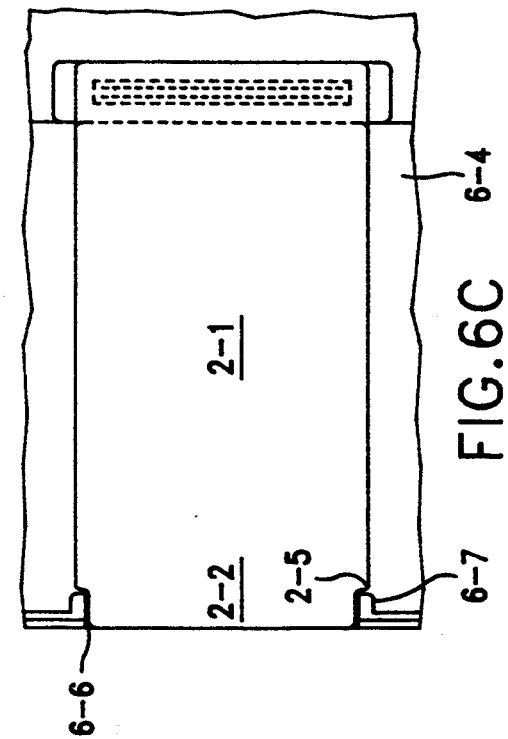

FIG. 6C shows how a module with rear protruding port is mounted on lower case assembly 6-4. It is a top view of lower case assembly 6-4 with module 2-1 loaded on top of it. The rear protruding port 2-2 of module 2-1 engages and securely attaches to the side opening 6-6 of the lower case assembly 6-4 in a removable manner whereby module 2-1 can be vertically mounted on or removed from lower case assembly 6-4 when upper case assembly 6-1 is removed. The rear protruding edge 2-5 of the rear protruding port 2-2 engages and removably attaches to the correspondent inner side 6-7 of said U-shaped side opening 6-6 whereby said module assembly is more reliably mounted to the lower case assembly 6-4.

Figure 6D:
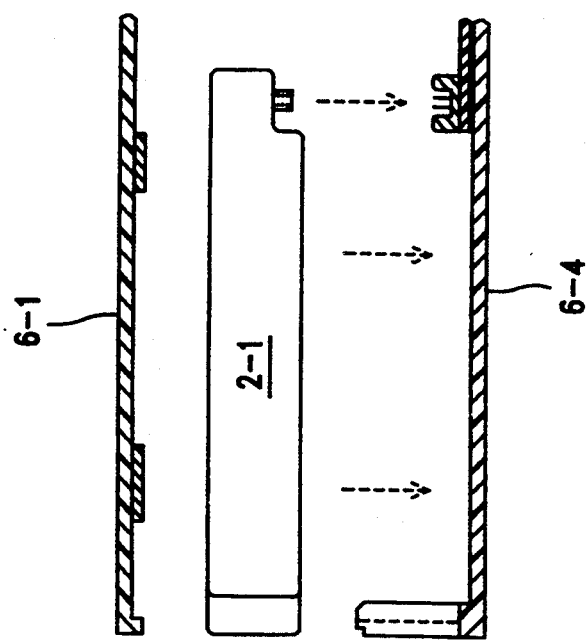
Figure 6D:
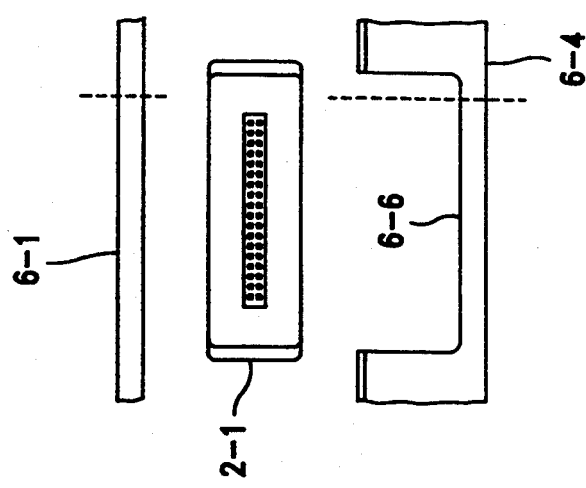

FIG. 6D is an exploded side section view and a rear view of the external enclosure case and the module. It shows that module 2-1 and upper case assembly 6-1 can be vertically mounted on or removed from lower case assembly 6-4. The side view of FIG. 6D is a side section view of upper case assembly 6-1 and lower case assembly 6-4, and a side view of module 2-1 in a disassembled form. The rear view of FIG. 6D shows the disassembled upper case assembly 6-1, lower case assembly 6-4, and module 2-1.

Figure 6E:
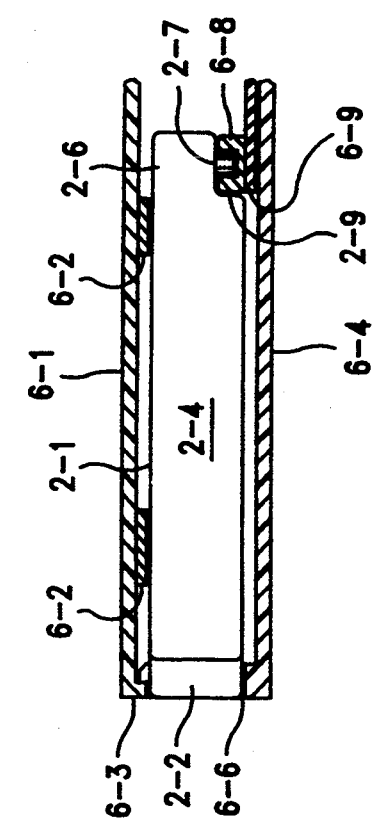
Figure 6E:
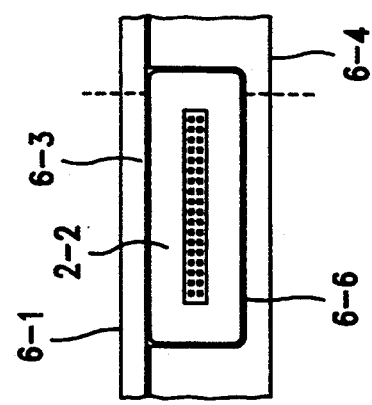

FIG. 6E shows how module 2-1 is clamped between upper case assembly 6-1 and lower case assembly 6-4. It shows that the clamping means 6-2 of the upper case assembly 6-1 engages and removably attaches to the upper end of the module assembly 2-1 whereby the module assembly 2-1 is horizontally clamped between the upper and lower case assemblies. The side view of FIG. 6E is a side section view of upper case assembly 6-1 and lower case assembly 6-4, and a side view of module 2-1 wherein the rear protruding port 2-2 of module 2-1 is clamped between the side panel 6-3 of the upper case assembly 6-1 and side opening 6-6 of the lower case assembly 6-4. The cushion pads 6-2 installed as the clamping means of the upper case assembly 6-1 are used to enhance the module clamping and also provide shock protection to module 2-1. The module connector 2-7 of the module head 2-6 is vertically plugged in the BUS receptacle 6-8 of the lower case assembly 6-4 in a removable manner. The vertical front edge 2-9 of the module body 2-4 engages and securely attaches to the vertical edge 6-9 of the BUS receptacle 6-8 so that the module 2-1 can be more reliably mounted to the lower case assembly 6-4 horizontally. The rear view of FIG. 6E shows that the rear protruding port 2-2 of module 2-1 is clamped between the side panel 6-3 of upper case assembly 6-1 and side opening 6-6 of lower case assembly 6-4. The upper end of the rear protruding port 2-2 is clamped downward by the upper case assembly 6-1 to the U-shaped side opening 6-6 of the lower case assembly 6-4 whereby module 2-1 is reliably mounted inside the external enclosure case horizontally by upper end clamping and rear protruding port clamping.

FIG. 6D and FIG. 6E show that the rear protruding port of the module body engages and securely attaches to the U-shaped side opening of the lower case assembly in a removable manner whereby the rear protruding port of the module body can be accessed externally from the rear end, and the module assembly is upwardly supported by said lower case assembly over said module head and said rear protruding port only.

Figure 7A:
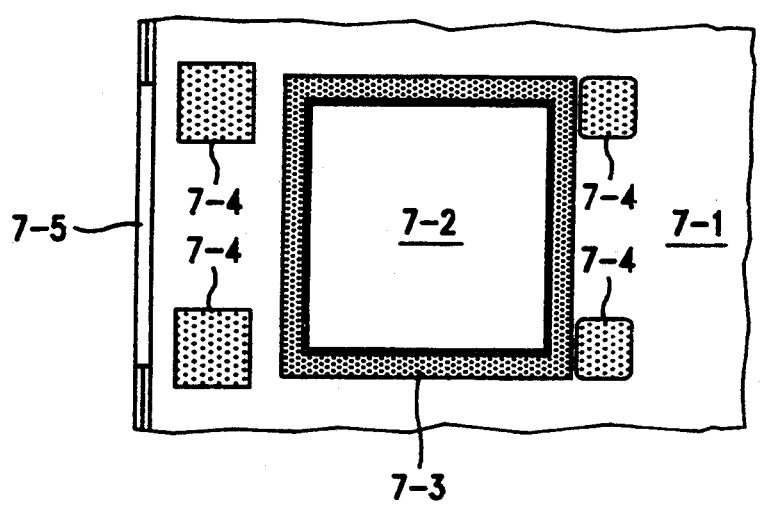
FIGS. 7A–7C illustrates mounting a module with both rear and upper protruding ports inside an external enclosure case.
Figure 7B:
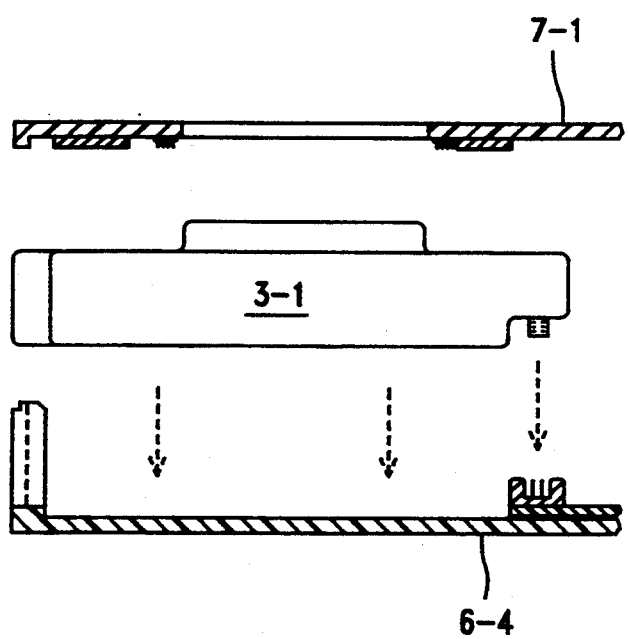
Figure 7C:
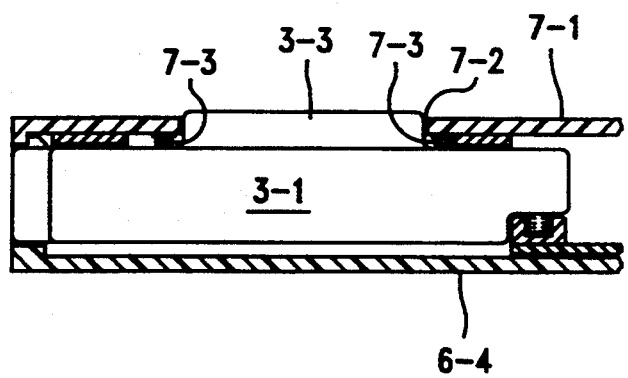

FIGS. 7A-7C illustrates mounting a module with both rear and upper protruding ports inside an external enclosure case. FIG. 7A is a bottom view of part of an upper case assembly 7-1 having a top opening 7-2 with cushion means 7-3 installed around it. Four cushion pads 7-4 are also installed on upper case assembly 7-1 for module clamping. Side panel 7-5 of the upper case assembly 7-1 will clamp the upper end of a rear protruding port when the case is in closed position.

FIG. 7B shows that upper case assembly 7-1 and module 3-1 can be vertically mounted on or removed from lower case assembly 6-4. It is a side section view of upper case assembly 7-1 and lower case assembly 6-4 and a side view of module 3-1 in a disassembled form.

FIG. 7C shows how module 3-1 is clamped between upper case assembly 7-1 and lower case assembly 6-4. FIG. 7C is a side section view of upper case assembly 7-1, lower case assembly 6-4, and a side view of module 3-1 wherein module 3-1 is clamped in between with its upper protruding port 3-3 extending through the top opening 7-2 of upper case assembly 7-1 on top of the upper protruding port 3-3 and is accessible externally from the top. Cushion means 7-3 installed around the inner side of top opening 7-2 engages and securely attaches to the surrounding part of upper protruding port 3-3 of module 3-1. Cushion means 7-3 is made of metallic material and its main purpose is to provide electromagnetic interference (EMI) and radio frequency interference (RFI) protection to the system, although it can also be used for mounting purposes.

Figure 8A:
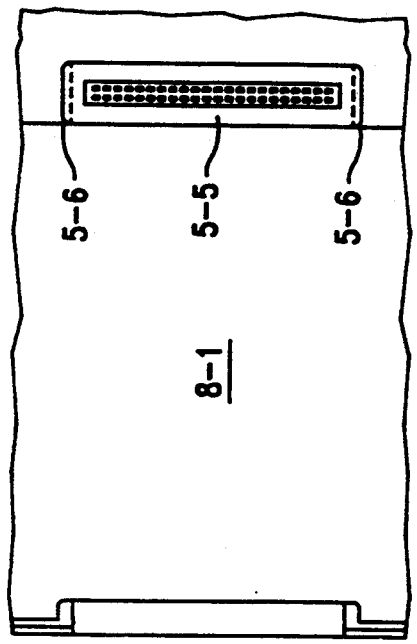
FIGS. 8A–8D illustrates mounting a module assisted by front end latching means.

FIGS. 8A-8D illustrates using a front end latching means to assist the module mounting. FIG. 8A shows the construction of a lower case assembly with a latch receiving means in its front end. It is a top view of part of a lower case assembly 8-1 which is similar to lower case assembly 6-4 except that it uses the BUS receptacle 5-5 which has two hook receiving devices 5-6 on both sides.

Figure 8B:
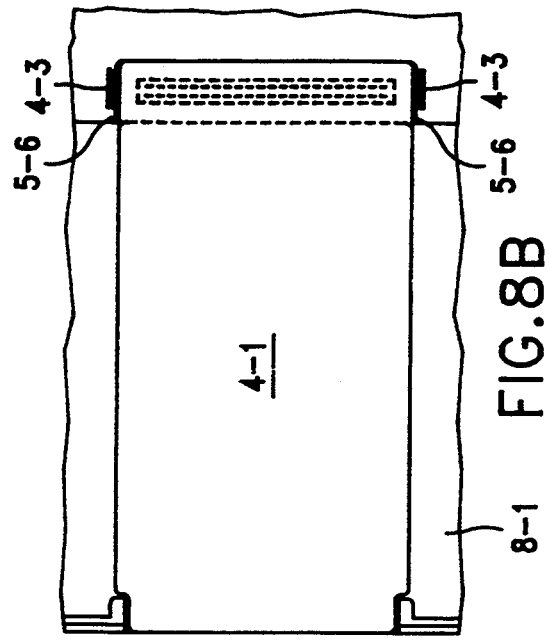

FIG. 8B shows how module 4-1 is mounted on the lower case assembly 8-1. It is a top view of lower case assembly 8-1 loaded with module 4-1. The two elastic clip devices 4-3 of module 4-1 hook to the hook receiving devices 5-6 of the BUS receptacle 5-5.

Figure 8C:
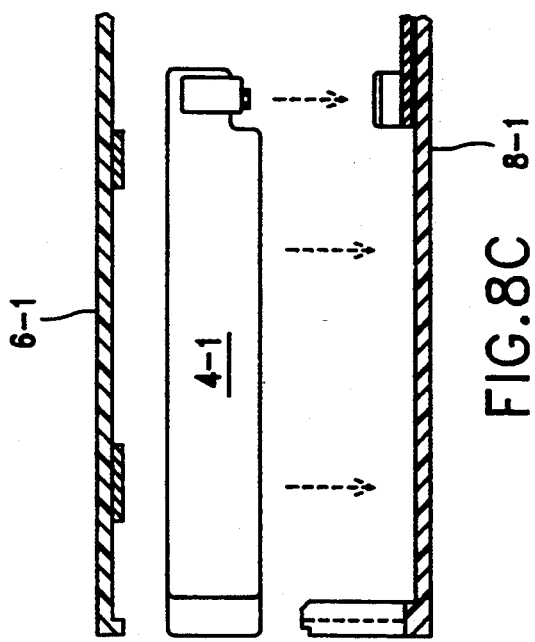

FIG. 8C shows how module 4-1 and upper case assembly 6-1 can be vertically mounted on or removed from the lower case assembly 8-1. It is a side section view of upper case assembly 6-1 and lower case assembly 8-1, and a side view of module 4-1 in a disassembled form.

Figure 8D:
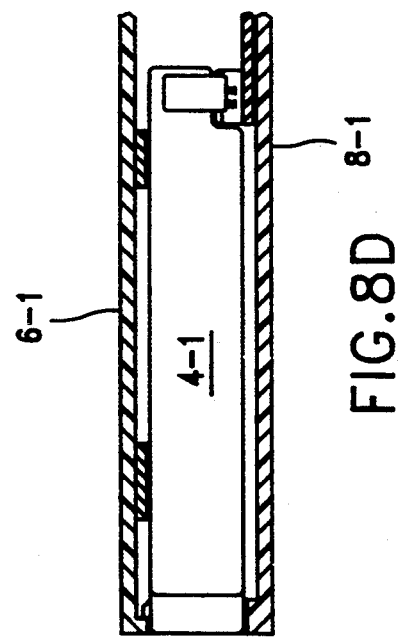

FIG. 8D shows how module 4-1 is clamped between upper case assembly 6-1 and lower case assembly 8-1. It shows a side section view of upper case assembly 6-1 and lower case assembly 8-1, and a side view of module 4-1 wherein module 4-1 is clamped in between. The front end latching means can help secure the front end connection between the module connector and the BUS receptacle. It also makes a module less reliant on the upper case clamping for module mounting. The use of low-profile or low insertion force connector as module connector is also possible for such front end latching.

Figure 9A:
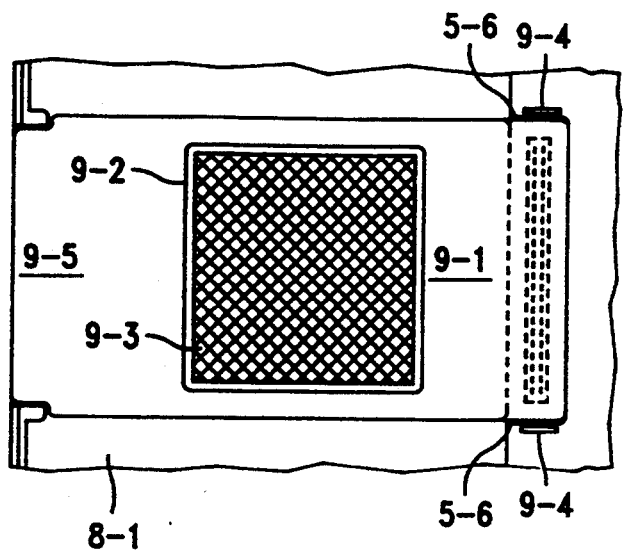
FIGS. 9A–9C illustrates mounting a module with both rear and upper protruding ports assisted by front end latching means.
Figure 9B:
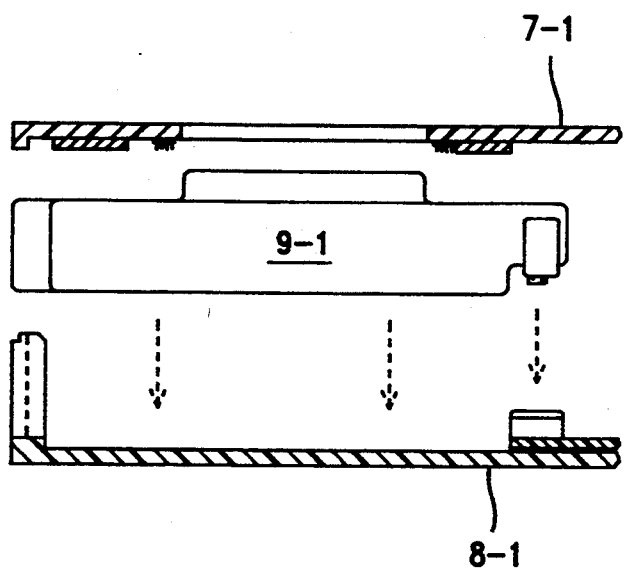
Figure 9C:
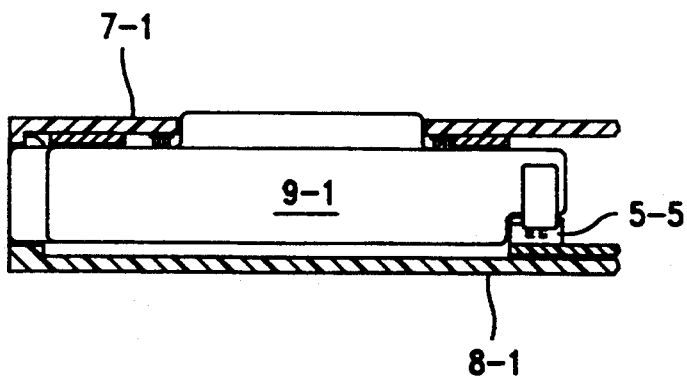

FIGS. 9A-9C illustrates mounting a module with both rear and upper protruding ports assisted by front end latching means. FIG. 9A is a top view of the lower case assembly with the module installed. It is a top view of lower case assembly 8-1 loaded with module 9-1. Module 9-1 has a speaker 9-3 on its upper protruding port 9-2, two elastic clip devices 9-4, and one rear protruding port 9-5. Two elastic clip devices 9-4 are hooked to the hook receiving devices 5-6 of the BUS receptacle 5-5.

FIG. 9B shows that module 9-1 and upper case assembly 7-1 can be vertically mounted on or removed from lower case assembly 8-1. It is a side section view of upper case assembly 7-1 and lower case assembly 8-1, and a side view of module 9-1 in a disassembled form.

FIG. 9C shows how module 9-1 is clamped between the upper case assembly 7-1 and lower case assembly 8-1. It is a side section view of upper case assembly 7-1 and lower case assembly 8-1, and a side view of module 9-1 wherein module 9-1 is clamped in between and its front end is tightly latched to BUS receptacle 5-5.

Figure 10A:
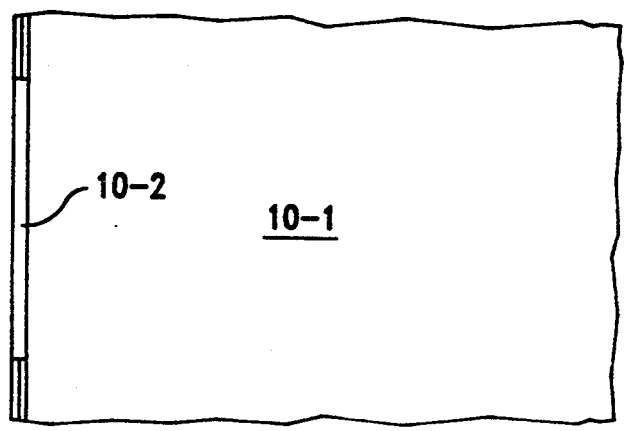
FIGS. 10A–10C illustrates that a module installed in an external enclosure case by front end latching and rear end clamping can totally eliminate the need for upper case clamping.
Figure 10B:
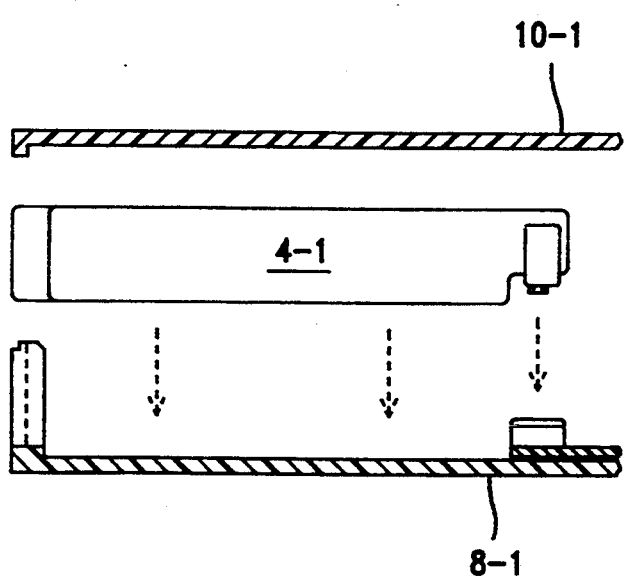
Figure 10C:
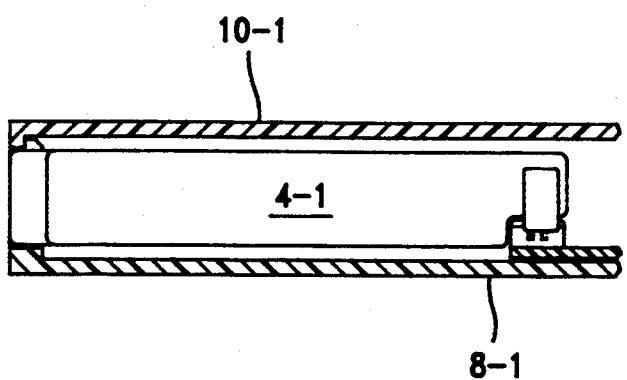

FIGS. 10A–10C illustrates that a module installed in an external enclosure case by front end latching and rear end clamping can totally eliminate the need for upper case clamping. FIG. 10A is a bottom view of part of an upper case assembly 10-1 without any cushion pad. The upper case assembly 10-1 has a side panel 10-2 for clamping the upper end of a rear protruding port mounted under it.

FIG. 10B shows that module 4-1 and upper case assembly 10-1 can be vertically mounted on or removed from lower case assembly 8-1. It is a side section view of upper case assembly 10-1 and lower case assembly 8-1, and a side view of module 4-1 in a disassembled form.

FIG. 10C shows how module 4-1 is clamped between the upper case assembly 10-1 and lower case assembly 8-1. It is a side section view of upper case assembly 10-1 and lower case assembly 8-1, and a side view of module 4-1 wherein module 4-1 is mounted in between. FIG. 10C shows that module 4-1 is reliably mounted inside the external enclosure case horizontally by front end latching and rear protruding port clamping. The reliance on upper case clamping for module mounting can totally be eliminated.

Figure 11A:
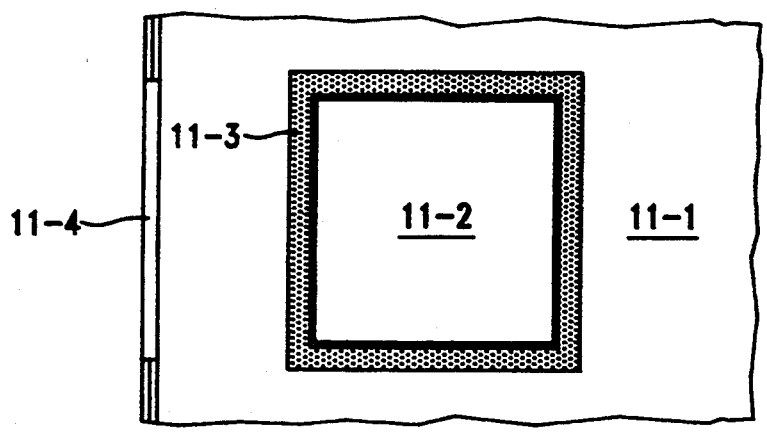
FIGS. 11A–11C similar to FIGS. 10A–10C except that the module installed has an upper protruding port.
Figure 11B:
Figure 11B:
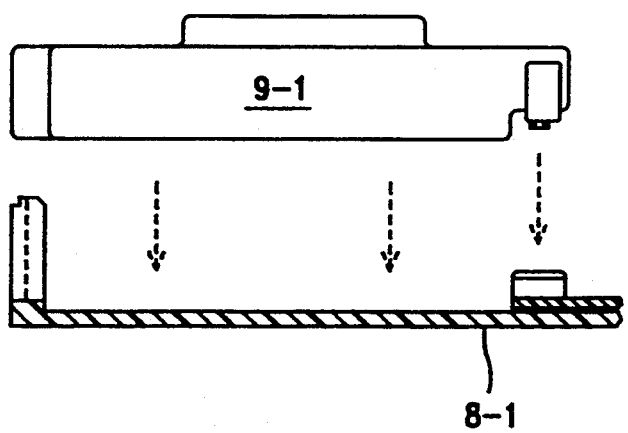
Figure 11C:
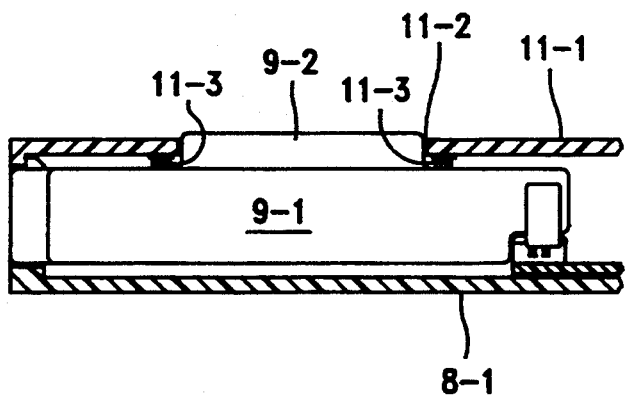

FIGS. 11A–11C is similar to FIGS. 10A–10C except that the module installed has an upper protruding port. FIG. 11A is a bottom view of part of an upper case assembly 11-1 with a top opening 11-2 and a cushion means 11-3 installed around the top opening 11-2. The upper case assembly 11-1 has a side panel 11-4 for clamping the upper end of a rear protruding port mounted under it.

FIG. 11B shows that module 9-1 and upper case assembly 11-1 can be vertically mounted on or removed from lower case assembly 8-1. It is a side section view of upper case assembly 11-1 and lower case assembly 8-1, and a side view of module 9-1 in a disassembled form.

FIG. 11C shows how module 9-1 is clamped between the upper case assembly 11-1 and lower case assembly 8-1. It is a side section view of upper case assembly 11-1, lower case assembly 8-1, and a side view of module 9-1 wherein module 9-1 is mounted in between with its upper protruding port 9-2 extending through the top opening 11-2 of upper case assembly 11-1. Cushion means 11-3 installed around the inner side of top opening 11-2 engages and securely attaches to the surrounding part of upper protruding port 9-2 of module 9-1. Cushion means 11-3 is made of metallic material and its main purpose is to provide electromagnetic interference (EMI) and radio frequency interference (RFI) protection to the system, although it can also be used for mounting purposes. FIG. 11C shows that the reliance on upper case clamping for module mounting can be totally eliminated.

FIGS. 12A–12E illustrates the construction and usage of a mounting kit with rear protruding port. It shows the construction of a mounting kit assembly having a mounting kit attachment means wherein the mounting kit attachment means of the mounting kit engages and securely attaches to the upper end of a module assembly in a removably manner to facilitate the mounting of said module assembly.

FIG. 12A shows the front, side, rear and bottom views of a mounting kit with rear protruding port. It shows the front view, side view, rear view and bottom view of the mounting kit 12-1 which has a rear protruding port 12-2 and two pairs of holding arms 12-3.

FIG. 12B shows how a composite module is created by using mounting kit 12-1. It shows the side view and rear view of the composite module 12-6 created by stacking mounting kit 12-1 on top of a small module 12-4 which has a rear protruding port 12-5.

Figure 12C:
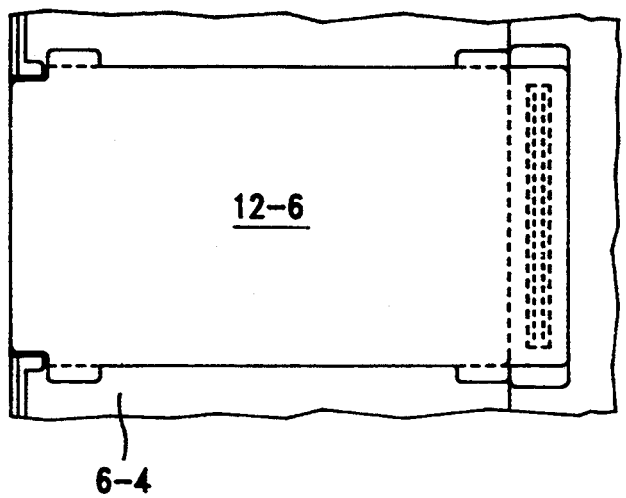

FIG. 12C shows how composite module 12-6 is mounted on the lower case assembly 6-4. It is a top view of lower case assembly 6-4 with the composite module 12-6 installed on top of it.

Figure 12D:
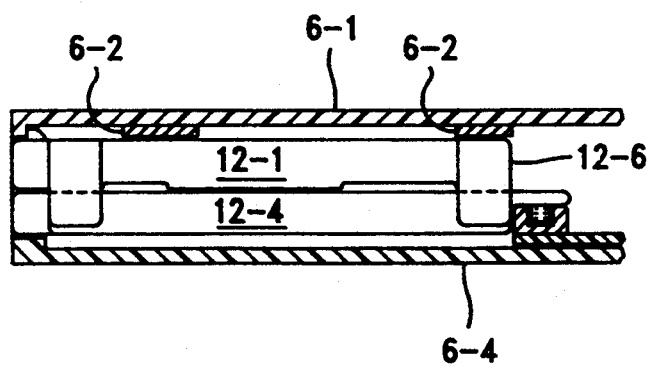

FIG. 12D shows that how composite module 12-6 is clamped between the upper case assembly 6-1 and lower case assembly 6-4. It shows that the clamping means 6-2 of the upper case assembly 6-1 engages and removably attaches to the upper end of the mounting kit assembly 12-1 whereby the mounting kit assembly 12-1 and the module assembly 12-4 attached under it are horizontally clamped between upper case assembly 6-1 and lower case assembly 6-4. It is a side section view of the upper case assembly 6-1 and lower case assembly 6-4, and a side view of the composite module 12-6 wherein module 12-6 is clamped in between just like the integral module 2-1 in FIG. 6E.

Figure 12E:
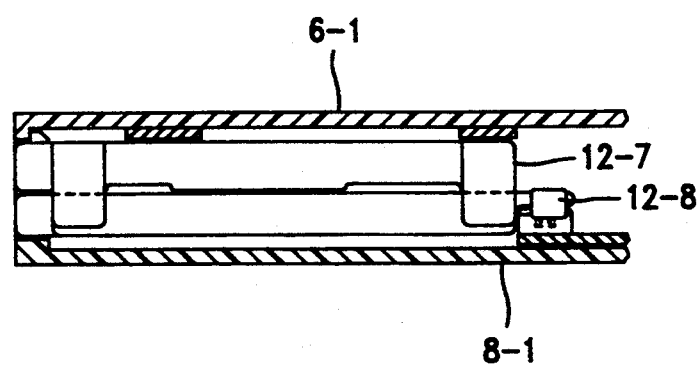

FIG. 12E is similar to FIG. 12D except that the composite module 12-7 has a front end latching means 12-8 on both sides of its module head. It is a side section view of the upper case assembly 6-1 and lower case assembly 8-1, and a side view of the composite module 12-7 wherein module 12-7 is clamped in between just like the integral module 4-1 in FIG. 8D.

FIGS. 13A–13E illustrates the construction and mounting of a composite module with changeable upper module. A composite module is a special module which comprises at least two small module assemblies each having at least one small module attachment means wherein said small module attachment means of one of said small module assemblies engages and securely attaches to said small module attachment means of another of said small module assemblies in a removable manner. With proper attachment design, a composite module can be assembled or disassembled by hand without tools. A composite module allows changing of its electronic functions or mechanical features by changing its small module assemblies.

Figure 13A:
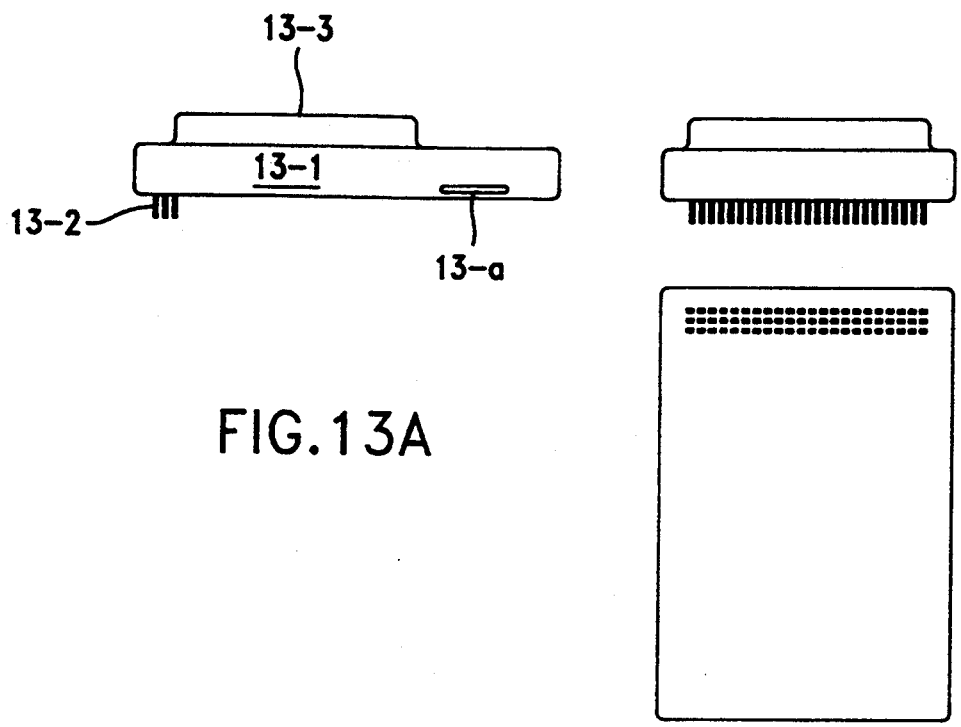
FIGS. 13A–13F illustrates the construction and mounting of a composite module with changeable upper module.

FIG. 13A shows the construction of a small module with upper protruding port. It shows the front view, side view and bottom view of a small module 13-1 with an upper protruding port 13-3, a narrow groove 13-a on left- and right-hand sides of module 13-1 as a latch receiving means for holding arms 13-7 of module 13-4, and a rigid male connector 13-2 on its rear bottom end for transmitting signals and/or power. Male connector 13-2 is used as the small module attachment means of module 13-1 which will connect to the female receptacle 13-5 of module 13-4 in FIG. 13B.

Figure 13B:
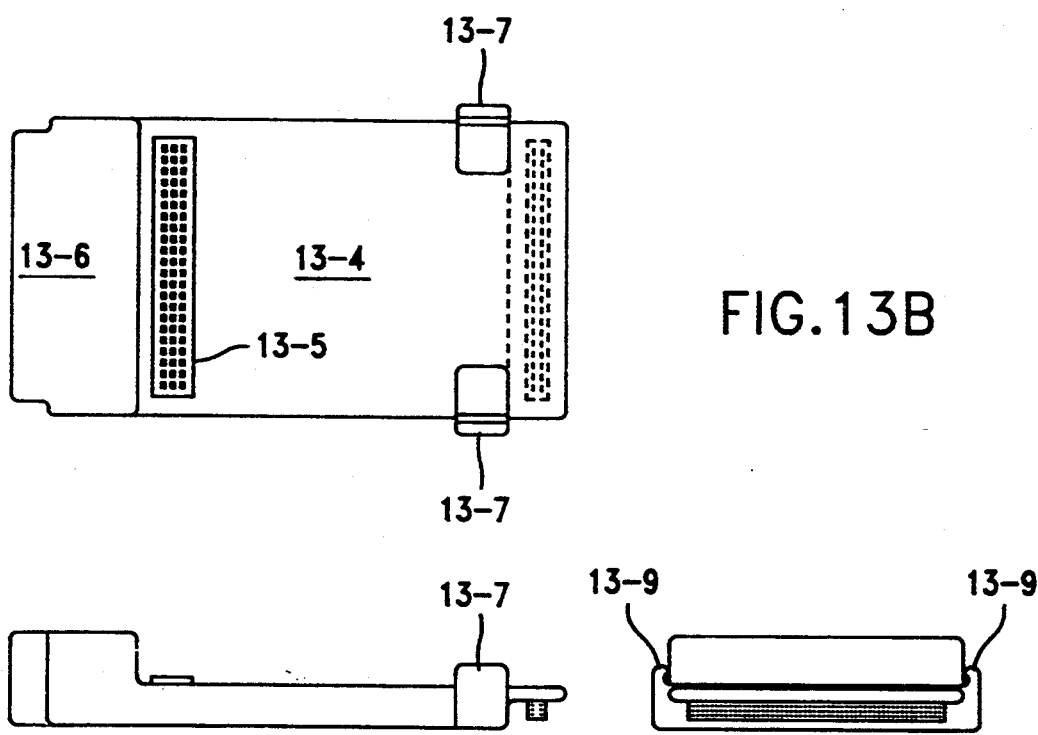

FIG. 13B shows the construction of a base module 13-4. It shows the top view, front view and side view of module 13-4 with a rear protruding port 13-6, rigid female receptacle 13-5 and two upward holding arms 13-7 with protruding edges 13-9 as a latching means. Receptacle 13-5 is used as the small module attachment means of module 13-4 which will connect to connector 13-2 of module 13-1.

Figure 13C:
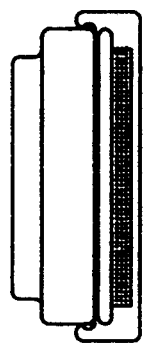
Figure 13C:
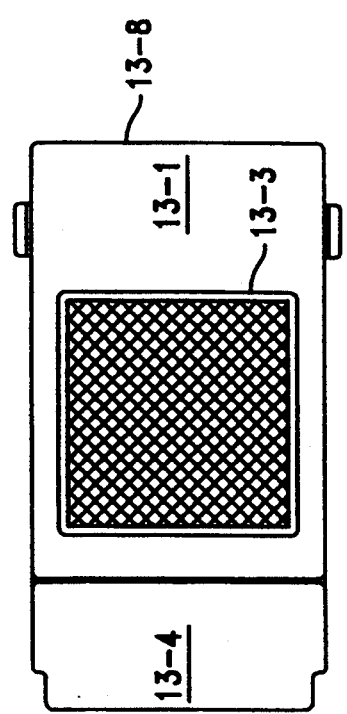
Figure 13C:
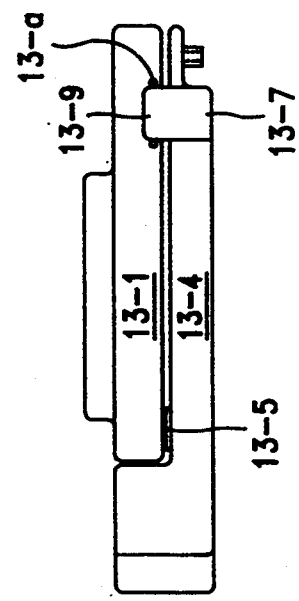

FIG. 13C shows the top view, front view and side view of the composite module 13-8 created by latching module 13-1 on top of module 13-4. The latching means 13-9 of module 13-4 engages and securely latches to the latch receiving means 13-a on both sides of module 13-1 in a removable manner whereby module 13-1 and module 13-4 are tightly latched together and can be mounted like an integral module. At the same time, connector 13-2 (not shown) of module 13-1 also engages and securely plugs in receptacle 13-5 of module 13-4 in a removable manner whereby module 13-1 and module 13-4 are more reliably connected together.

Figure 13D:
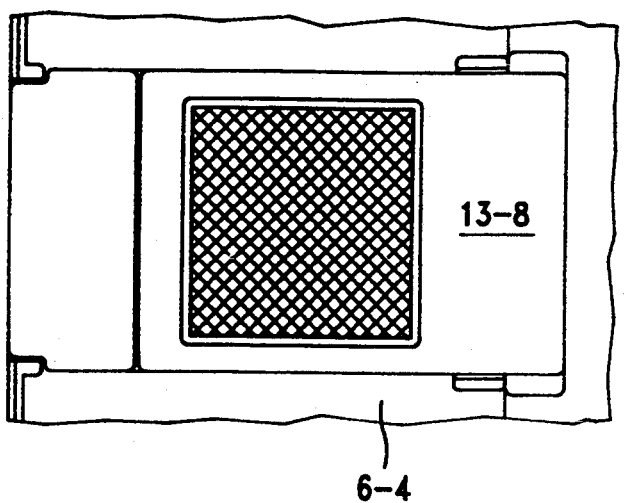

FIG. 13D shows how the composite module 13-8 is mounted on the lower case assembly 6-4. It is a top view of the lower case assembly 6-4 with the composite module 13-8 installed on top of it.

Figure 13E:
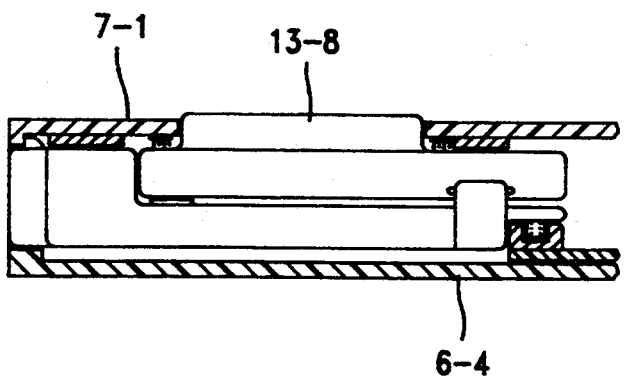

FIG. 13E shows how the composite module 13-8 is clamped between the upper case assembly 7-1 and lower case assembly 6-4. It is a side section view of the upper case assembly 7-1 and lower case assembly 6-4 and a side view of the composite 13-8 wherein module 13-8 is clamped between the upper case assembly 7-1 and the lower case assembly 6-4 just like the integral module 3-1 in FIG. 7C.

Figure 13F:
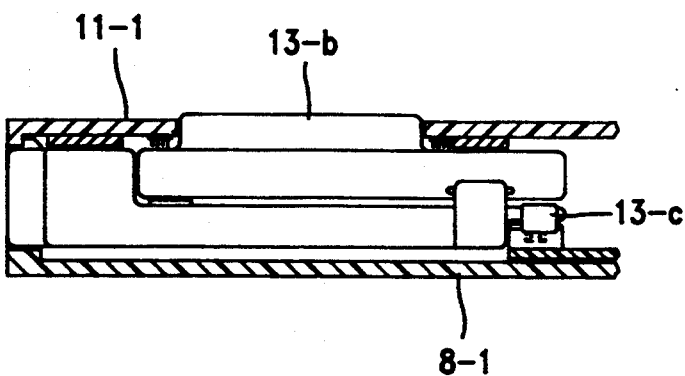

FIG. 13F is similar to FIG. 13E except that the composite module 13-b has a front end latching means 13-c on both sides of its module head. It is a side section view of the upper case assembly 11-1 and lower case assembly 8-1 and a side view of the composite 13-b wherein module 13-b is mounted between the upper case assembly 11-1 and the lower case assembly 8-1 just like the integral module 9-1 in FIG. 11C. FIGS. 13A-13F shows that the upper protruding port of such composite modules can be easily changed by using different upper modules.

FIGS. 14A-14D illustrates the construction of a PCB module and its mounting. It shows a PCB module comprising two PCB board assemblies, two shoulder PCB board mounting kits, and one tail PCB mounting kit. Each PCB board mounting kit has a mounting kit attachment means which engages and securely attaches to PCB board assembly so that the PCB module assembly can be reliably mounted inside an external enclosure case like other modules by the help of PCB board mounting kits.

Figure 14A:
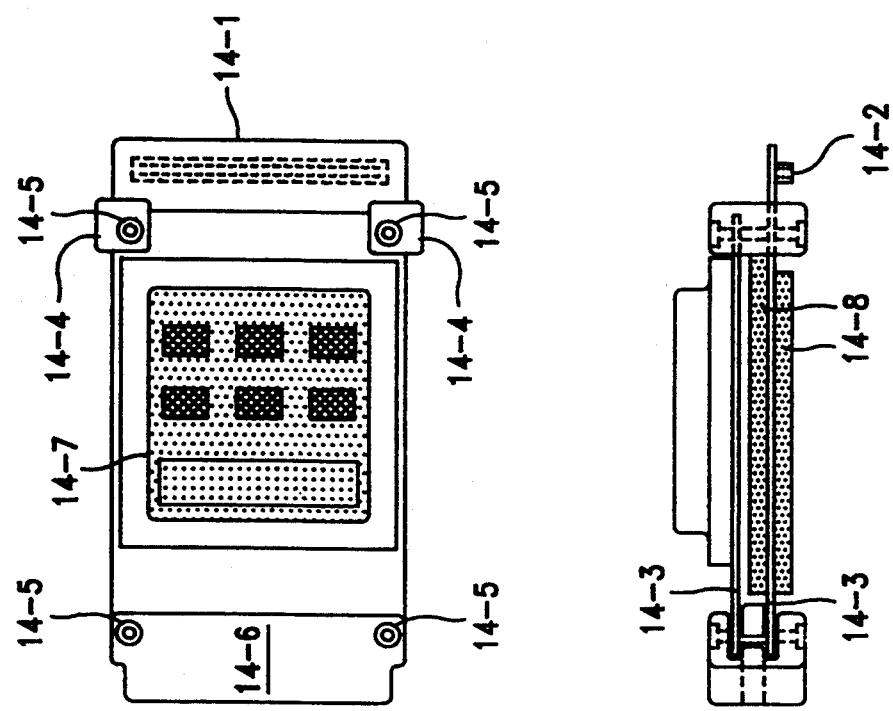
FIG. 14A–14D illustrates the construction of a PCB module and its mounting.
Figure 14A:
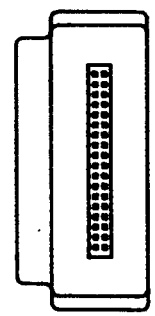

FIG. 14A shows the top, side and rear view of the PCB module with rear and upper protruding ports. The upper protruding port 14-7 is a control panel which has a LED display and six keys. Module 14-1 comprises two PCB board assemblies 14-3, one module connector 14-2, two shoulder PCB board mounting kits 14-4 fastened to PCB board assemblies 14-3 by two fasteners 14-5, and one rear PCB board mounting kit 14-6 with two fasteners 14-5. The lower PCB board assembly 14-3 have two component sides 14-8. The top and bottom sides of the PCB board mounting kits 14-4 and 14-6 are substantially flat for module clamping.

Figure 14B:
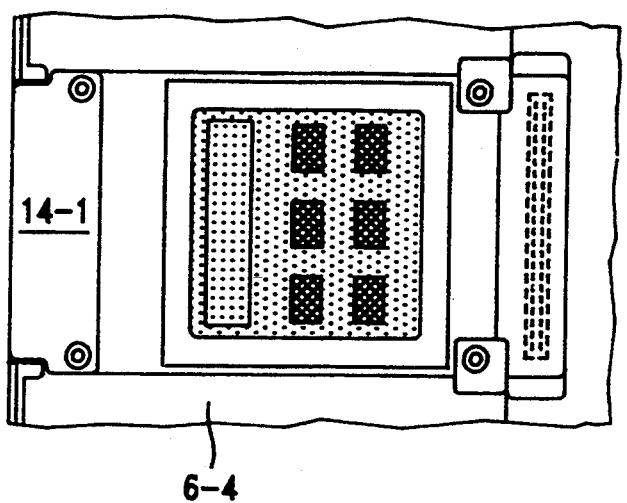

FIG. 14B shows how the PCB module 14-1 is mounted on the lower case assembly 6-4. It is a top view of lower case assembly 6-4 with module 14-1 mounted on top of it.

Figure 14C:
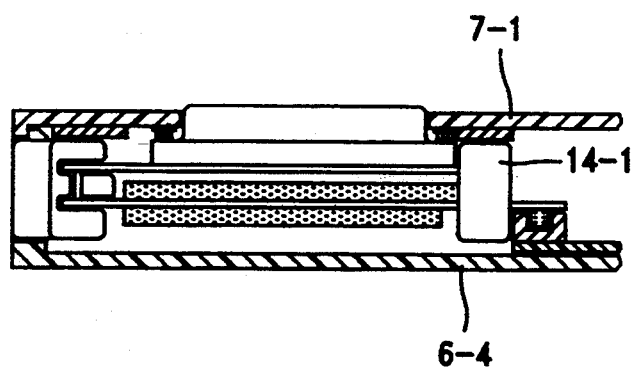

FIG. 14C shows how the PCB module 14-1 is clamped inside an external enclosure case. It is a side section view of the upper case assembly 7-1 and lower case assembly 6-4 and the side view of module 14-1 wherein module 14-1 is clamped between the upper case assembly 7-1 and the lower case assembly 6-4.

Figure 14D:
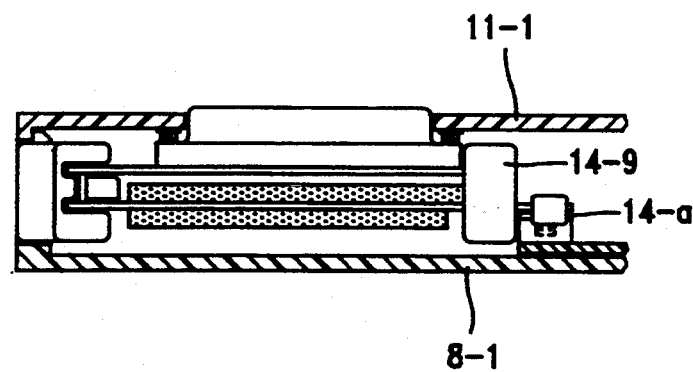

FIG. 14D is similar to FIG. 14C except that the PCB module 14-9 has a front end latching means 14-a on both sides of its module head. It is a side section view of the upper case assembly 11-1 and the lower case assembly 8-1 and the side view of module 14-9 wherein module 14-9 is mounted between the upper case assembly 11-1 and the lower case assembly 8-1 just like the integral module 9-1 in FIG. 11C.

Figure 15A:
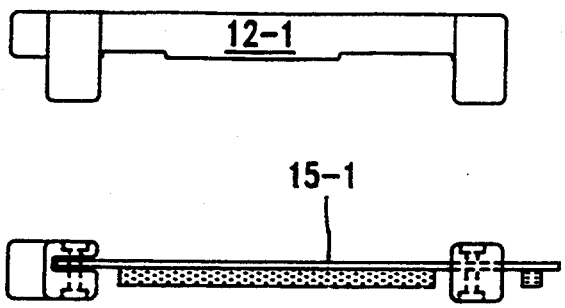
FIGS. 15A–15C illustrates the installation of a small PCB module by using a mounting kit.
Figure 15B:
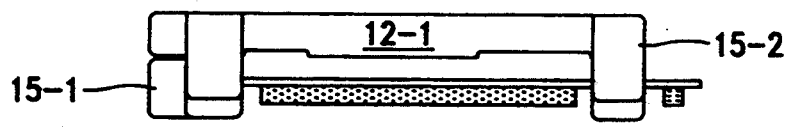
Figure 15C:
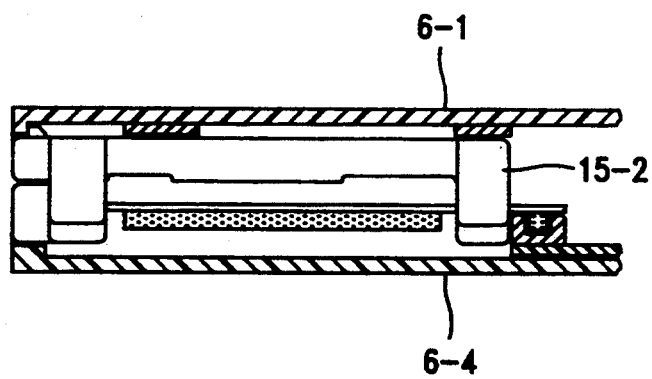

FIGS. 15A-15C illustrates the installation of a small PCB module 15-1 in a bigger external enclosure case by using the mounting kit 12-1. FIG. 15A is an exploded side view of the mounting kit 12-1 and the small PCB module 15-1.

FIG. 15B is a side view of the composite module 15-2 which is created by stacking the mounting kit 12-1 on top of the small PCB module 15-1.

FIG. 15C shows how the composite module 15-2 is mounted inside an external enclosure case. It is a side section view of the upper case assembly 6-1 and the lower case assembly 6-4, and a side view of the composite module 15-2 wherein module 15-2 is clamped in between, just like the integral module 2-1 in FIG. 6E.

Figure 16A:
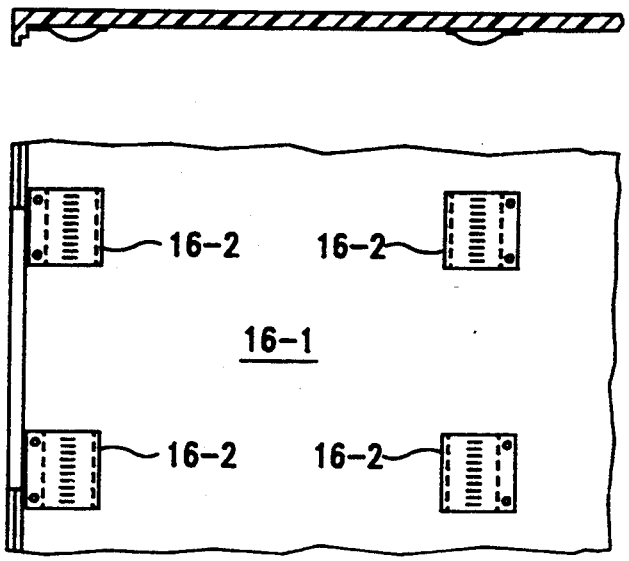
FIGS. 16A–16C illustrates using elastic springs as upper cushion means for module mounting.
Figure 16B:
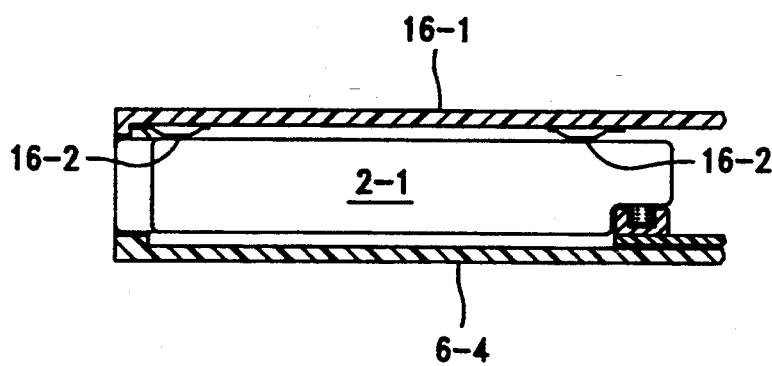
Figure 16C:
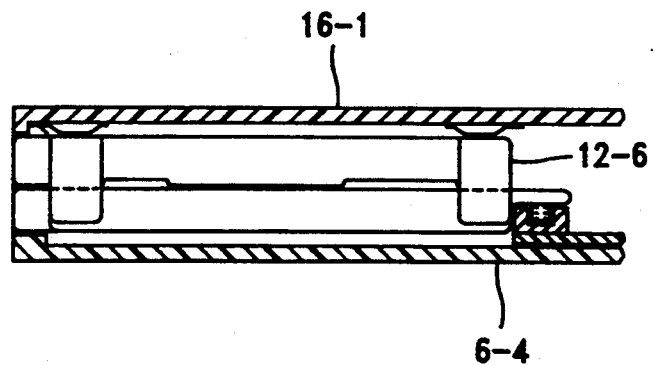

FIGS. 16A-16C illustrates the use of elastic springs as the clamping means of the upper case assembly for module mounting. Elastic springs can provide more shock protection to the module mounted under them. They also can help tolerate more module height differences. FIG. 16A shows the construction of such upper case assembly. It shows the side section view and the bottom view of upper case assembly 16-1 with four elastic springs 16-2 installed for module mounting.

FIG. 16B shows how a module with rear protruding port is clamped inside an external enclosure case with the upper elastic springs. It is a side section view of upper case assembly 16-1 and lower case assembly 6-4 and the side view of module 2-1 wherein module 2-1 is clamped in between with the assistance of the upper elastic springs 16-2.

FIG. 16C is similar to FIG. 16B except that module 2-1 is replaced by the composite module 12-6. It is a side section view of the upper case assembly 16-1 and the lower case assembly 6-4 and the side view of the composite module 12-6 wherein module 12-6 is clamped in between with the assistance of the upper elastic springs 16-2.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. A modularized electronic system for packaging and assembling one or more electronic module assemblies comprising:
one external enclosure case having at least two case assemblies each having at least one case assembly attachment means wherein said assembly attachment means of one of said case assemblies engages and securely attaches to said assembly attachment engages and securely attaches to said assembly attachment means of another of said case assemblies in a removable manner; one of said case assemblies comprising the top panel of said external enclosure case is called the upper case assembly and another of said case assemblies comprising the bottom panel of said external enclosure case is called the lower case assembly;

at least one electronic module assembly having a module head in its front end and a substantially rectangular module body behind said module head; said module head is rigidly connected to said module body; said module head further comprises a rigid module connector on its bottom facing downward for transmitting digital signals and/or power; said lower case assembly further comprises a correspondent rigid BUS receptacle wherein said module connector of the module head is vertically plugged in said BUS receptacle of the lower case assembly in a removable manner;

said module body further comprises a substantially rectangular protruding port on its rear end and said lower case assembly further comprises a side panel of the external enclosure case with a correspondent U-shaped side opening on its upper edge wherein the left, right and bottom sides of said rear protruding port engage and securely attach to the correspondent sides of said U-shaped side opening of the lower case assembly in a removable manner whereby said rear protruding port of the module body can be accessed externally from the rear end, and said module assembly is upwardly supported by said lower case assembly over said module head and said rear protruding port;

said upper case assembly further comprises at least one clamping means on its top panel wherein said clamping means of the upper case assembly engages and removably attaches to the upper end of said module assembly whereby said module assembly is horizontally clamped between said upper and lower case assemblies.

2. A modularized electronic system of claim 1 wherein:
said rear protruding port of the module assembly further comprises a protruding edge on at least one side wherein said protruding edge of the rear protruding port engages and removably attaches to the correspondent inner side of said U-shaped side opening whereby said module assembly is more reliably mounted to said lower case assembly.

3. A modularized electronic system of claim 1 wherein: said clamping means of the upper case assembly is a cushion means which can enhance the module clamping and also provide shock protection to said module assembly.

4. A modularized electronic system of claim 1 wherein: said clamping means of the upper case assembly is an elastic device which can provide shock protection to said module assembly and also better tolerate height differences for different module assemblies mounted under it.

5. A modularized electronic system of claim 1 wherein: said module assembly further comprises a substantially rectangular protruding port on its upper end and said upper case assembly further comprises a correspondent opening on top of said upper protruding port wherein said upper protruding port extends through said top opening whereby said upper protruding port is accessible externally from the top.

6. A modularized electronic system of claim 5 wherein: said top opening of the upper case assembly further comprises a metallic cushion means around its inner side wherein said cushion means engages and securely attaches to the surrounding part of said upper protruding port to provide electromagnetic interference and radio frequency interference protection.

7. A modularized electronic system of claim 1 wherein:
said module head further comprises a latching means and said BUS receptacle of the lower case assembly further comprises a correspondent latch receiving means wherein said latching means of the module head engages and securely latches to said latch receiving means of the BUS receptacle in a removable manner whereby the connection between said module connector of the module head and said BUS receptacle o the lower assembly is strongly secured.

8. A modularized electronic system of claim 7 wherein:
said latching means of the module head is two elastic clip devices installed on its left- and right-hand sides; each said elastic clip device has a hook device installed on its lower end; said latch receiving means of the BUS receptacle consists of two correspondent hook receiving devices on its left- and right-hand sides wherein said hook devices of the module head engage and securely hook to said hook receiving devices of the BUS receptacle whereby loose connection between said module connector and said BUS receptacle can be prevented.

9. A modularized electronic system of claim 1 wherein: said module connector of the module head is a female connector whereby said module assembly can be more durable for module installation and handling.

10. A modularized electronic system of claim 1 wherein:
the bottom of said module head on which said module connector is installed is offset from the bottom of said module body whereby said module connector can be positioned higher to make said module assembly more compact.

11. A modularized electronic system of claim 10 wherein:
said module body further comprises a substantially flat and straight vertical front edge between its bottom and said bottom of the module head and said BUS receptacle of the lower case assembly further comprises a correspondent flat and straight vertical edge wherein said vertical front edge of the module body engages and securely attached to said vertical edge of the BUS receptacle whereby said module assembly can be more reliably mounted to said lower case assembly horizontally.

12. A modularized electronic system of claim 1 wherein:
said module body further comprises at least one PCB board assembly and one PCB board mounting kit having a mounting kit attachment means wherein said mounting kit attachment means of the PCB board mounting kit engages and securely attaches to said PCB board assembly whereby said PCB module assembly can be reliably clamped between said upper and lower case assemblies by the help of PCB board mounting kit.

13. A modularized electronic system of claim 1 wherein:

said module assembly is a composite module which comprises at least two small module assemblies each having at least one small module attachment means wherein said small module attachment means of one of said small module assemblies engages and securely attaches to said small module attachment means of another of said small module assemblies in a removable manner whereby said composite module can be assembled or disassembled by hand and it further allows changing of its electronic functions or mechanical features by changing its small module assemblies.

14. A modularized electronic system of claim 13 wherein: said small module attachment means of one of said small module assemblies is a rigid connector for transmitting signals and/or power and said small module attachment means of another of said small module assemblies is a correspondent rigid receptacle wherein said connector of said small module assembly engages and securely plugs in said receptacle of another said small module assembly in a removable manner whereby said two small module assemblies are reliably connected together.

15. A modularized electronic system of claim 13 wherein:
said small module attachment means of one of said small module assemblies is a latching means and said small module attachment means of another of said small module assemblies is a latch receiving means wherein said latching means of said small module assembly engages and securely latches to said latch receiving means of another said small module assembly in a removable manner whereby said two small module assemblies are tightly latched together and can be mounted like an integral module.

16. A modularized electronic system for packaging and assembling one or more electronic module assemblies comprising:
one external enclosure case having at least two case assemblies each having at least one case assembly attachment means wherein said assembly attachment means of one of said case assemblies engages and securely attaches to said assembly attachment means of another of said case assemblies in a removable manner; one of said case assemblies comprising the top panel of said external enclosure case is called the upper case assembly and another of said case assemblies comprising the bottom panel of said external enclosure case is called the lower case assembly;
at least one electronic module assembly having a module head in its front end and a substantially rectangular module body behind said module head; said module head is rigidly connected to said module body; said module head further comprises a rigid module connector on its bottom facing downward for transmitting digital signals and/or power; said lower case assembly further comprises a correspondent rigid BUS receptacle wherein said module connector of the module head is vertically plugged in said BUS receptacle of the lower case assembly in a removable manner;
said module head further comprises a latching means on its left- and right-hand sides and said BUS receptacle of the lower case assembly further comprises a correspondent latch receiving means on both sides wherein said latching means of the module head engages and securely latches to said latch receiving means of the BUS receptacle in a removable manner whereby the connection between said module connector of the module head and said BUS receptacle of the lower case assembly is strongly secured;
said module body further comprises a substantially rectangular protruding port on its rear end and said lower case assembly further comprises a side panel of the external enclosure case with a correspondent U-shaped side opening on its upper edge wherein the left, right and bottom sides of said rear protruding port engage and securely attach to the correspondent sides of said U-shaped side opening of the lower case assembly in a removable manner whereby said rear protruding port of the module body can be accessed externally from the rear end, and said module assembly is upwardly supported by said lower case assembly over said module head and said rear protruding port;
the upper end of said rear protruding port is further clamped downward by said upper case assembly in said U-shaped side opening of the lower case assembly whereby said module assembly is reliably clamped between said upper and lower case assemblies horizontally by front end latching and rear protruding port clamping.

17. A modularized electronic system of claim 16 wherein:
said rear protruding port of the module assembly further comprises a protruding edge on at least one side wherein said protruding edge of the rear protruding port engages and removably attaches to the correspondent inner side of said U-shaped side opening whereby said module assembly is more reliably mounted to said lower case assembly.

18. A modularized electronic system of claim 16 wherein:
said module assembly further comprises a substantially rectangular protruding port on its upper end and said upper case assembly further comprises a correspondent opening on top of said upper protruding port wherein said upper protruding port extends through said top opening whereby said upper protruding port is accessible externally from the top.

19. A modularized electronic system of claim 18 wherein:
said top opening of the upper case assembly further comprises a metallic cushion means around its inner side wherein said cushion means engages and securely attaches to the surrounding part of said upper protruding port to provide electromagnetic interference and radio frequency interference protection.

20. A modularized electronic system of claim 16 wherein:
said latching means installed on left- and right-hand sides of said module head consists of two elastic clip devices; each said elastic clip device has a hook device installed on its lower end; said latch receiving means on both sides of said BUS receptacle of the lower case assembly consists of two correspondent hook receiving devices wherein said hook devices of the module head engage and securely hook to said hook receiving devices of the BUS receptacle to prevent loose connection.

21. A modularized electronic system of claim 16 wherein:

said module connector of the module head is a female connector whereby said module assembly can be more durable for module installation and handling.

22. A modularized electronic system of claim 16 wherein:

the bottom of said module head on which said module connector is installed is offset from the bottom of said module body whereby said module connector can be positioned higher to make said module assembly more compact.

23. A modularized electronic system of claim 22 wherein:

said module body further comprises a substantially flat and straight vertical front edge between its bottom and said bottom of the module head and said BUS receptacle of the lower case assembly further comprises a correspondent flat and straight vertical edge wherein said vertical front edge of the module body engages and securely attaches to said vertical edge of the BUS receptacle whereby said module assembly can be more reliably mounted to said lower case assembly horizontally.

24. A modularized electronic system of claim 16 wherein:

said module body further comprises at least on PCB board assembly and one PCB board mounting kit having a mounting kit attachment means wherein said mounting kit attachment means of the PCB board mounting kit engages and securely attaches to said PCB board assembly whereby said PCB module assembly can be reliably clamped between said upper and lower case assemblies by the help of PCB board mounting kit.

25. A modularized electronic system of claim 16 wherein:

said module assembly is a composite module which comprises at least two small module assemblies each having at least one small module attachment means wherein said small module attachment means of one of said small module assemblies engages and securely attaches to said small module attachment means of another of said small module assemblies in a removable manner whereby said composite module can be assembled or disassembled by hand and it further allows changing of its electronic functions or mechanical features by changing its small module assemblies.

26. A modularized electronic system of claim 25 wherein:

said small module attachment means of one of said small module assemblies is a rigid connector for transmitting signals and/or power and said small module attachment means of another of said small module assemblies is a correspondent rigid receptacle wherein said connector of said small module assembly engages and securely plugs in said receptacle of another said small module assembly in a removable manner whereby said two small module assemblies are reliably connected together.

27. A modularized electronic system of claim 25 wherein:

said small module attachment means of one of said small module assemblies is a latching means and said small module attachment means of another of said small module assemblies is a latch receiving means wherein said latching means of said small module assembly engages and securely latches to said latch receiving means of another said small module assembly in a removable manner whereby said two small module assemblies are tightly latched together and can be mounted like an integral module.

28. A modularized electronic system for packaging and assembling one or more electronic module assemblies comprising:

one external enclosure case having at least two case assemblies each having at least one case assembly attachment means wherein said assembly attachment means of one of said case assemblies engages and securely attaches to said assembly attachment means of another of said case assemblies in a removable manner; one of said case assemblies comprising the top panel of said external enclosure case is called the upper case assembly and another of said case assemblies comprising the bottom panel of said external enclosure case is called the lower case assembly;

at least one electronic module assembly having a module head in its front end and a substantially rectangular module body behind said module head; said module head is rigidly connected to said module body; said module head further comprises a rigid module connector on its bottom facing downward for transmitting digital signals and/or power; said lower case assembly further comprises a correspondent rigid BUS receptacle wherein said module connector of the module head is vertically plugged in said BUS receptacle of the lower case assembly in a removable manner;

at least one mounting kit assembly having a mounting kit attachment means wherein said mounting kit attachment means of the mounting kit engages and securely attaches to the upper end of said module assembly in a removably manner to facilitate the mounting of said module assembly in a bigger external enclosure case by using said mounting kit;

said module body further comprises a substantially rectangular protruding port on its rear end and said lower case assembly further comprises a side panel of the external enclosure case with a correspondent U-shaped side opening on its upper edge wherein the left, right and bottom sides of said rear protruding port engage and securely attach to the correspondent sides of said U-shaped side opening of the lower case assembly in a removable manner whereby said rear protruding port of the module body can be accessed externally from the rear end, and said module assembly is upwardly supported by said lower case assembly over said module head and said rear protruding port;

said upper case assembly further comprises at least one clamping means on its top panel wherein said clamping means of the upper case assembly engages and removably attaches to the upper end of said mounting kit assembly whereby said mounting kit assembly and said module assembly attached under it are horizontally clamped between said upper and lower case assemblies.

29. A modularized electronic system of claim 28 wherein:

said rear protruding port of the module assembly further comprises a protruding edge on at least one side wherein said protruding edge of the rear protruding port engages and removably attaches to the correspondent inner side of said U-shaped side opening whereby said module assembly is more reliabl mounted to said lower case assembly.

30. A modularized electronic system of claim 28 wherein:
said clamping means of the upper case assembly is a cushion means which can enhance the mounting kit and module clamping and also provide shock protection to the mounting kit and module assembly.

31. A modularized electronic system of claim 28 wherein:
said clamping means of the upper case assembly is an elastic device which can provide shock protection to said module assembly and also better tolerate height differences for different module assemblies mounted under it.

32. A modularized electronic system of claim 28 wherein:
said module head further comprises a latching means and said BUS receptacle of the lower case assembly further comprises a correspondent latch receiving means wherein said latching means of the module head engages and securely latches to said latch receiving means of the BUS receptacle in a removable manner whereby the connection between said module connector of the module head and said BUS receptacle of the lower case assembly is strongly secured.

33. A modularized electronic system of claim 32 wherein:
said latching means of the module head consists of two elastic clip devices installed on its left- and right-hand sides; each said elastic clip device has a hook device installed on its lower end; said latch receiving means of the BUS receptacle consists of two correspondent hook receiving devices on its left- and right-hand sides wherein said hook devices of the module head engage and securely hook to said hook receiving devices of the BUS receptacle whereby loose connection between said module connector and said BUS receptacle can be prevented.

34. A modularized electronic system of claim 28 wherein:
said module connector of the module head is a female connector whereby said module assembly can be more durable for module installation and handling.

35. A modularized electronic system of claim 28 wherein:
the bottom of said module head on which said module connector is installed is offset from the bottom of said module body whereby said module connector can be positioned higher to make said module assembly more compact.

36. A modularized electronic system of claim 35 wherein:
said module body further comprises a substantially flat and straight vertical front edge between its bottom and said bottom of the module head and said BUS receptacle of the lower case assembly further comprises a correspondent flat and straight vertical edge wherein said vertical front edge of the module body engages and securely attaches to said vertical edge of the BUS receptacle whereby said module assembly can be more reliably mounted to said lower case assembly horizontally.

37. A modularized electronic system of claim 28 wherein:
said module body further comprises at least one PCB board assembly and one PCB board mounting kit having a mounting kit attachment means wherein said mounting kit attachment means of the PCB board mounting kit engages and securely attaches to said PCB board assembly whereby said PCB module assembly can be reliably clamped between said upper and lower case assemblies by the help of PCB board mounting kit.

* * * * *